US009509686B2

(12) United States Patent
Anantha et al.

(10) Patent No.: US 9,509,686 B2
(45) Date of Patent: Nov. 29, 2016

(54) SECURE ELEMENT AUTHENTICATION

(75) Inventors: Anoop Anantha, Kirkland, WA (US); Murali R. Krishnan, Clyde Hill, WA (US); Alan L. Marshall, Kirkland, WA (US); Kamran Rajabi Zargahi, Seattle, WA (US); Miller Thomas Abel, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 12/959,715

(22) Filed: Dec. 3, 2010

(65) Prior Publication Data

US 2012/0144201 A1    Jun. 7, 2012

(51) Int. Cl.
*H04L 9/32* (2006.01)
*H04L 29/06* (2006.01)
*H04L 9/08* (2006.01)
*H04W 12/06* (2009.01)

(52) U.S. Cl.
CPC ......... *H04L 63/0853* (2013.01); *H04L 9/0897* (2013.01); *H04L 9/3226* (2013.01); *H04L 9/3234* (2013.01); *H04L 9/3271* (2013.01); *H04W 12/06* (2013.01); *H04L 2209/80* (2013.01)

(58) Field of Classification Search
CPC .......... G06F 21/30; G06F 21/31; G06F 21/32; G06F 21/36; G06F 21/86; H04L 9/3271
See application file for complete search history.

(56) References Cited

U.S. PATENT DOCUMENTS

| | | | |
|---|---|---|---|
| 5,394,609 A | 3/1995 | Ferguson et al. |
| 5,533,123 A | 7/1996 | Force et al. |
| 5,590,038 A | 12/1996 | Pitroda |
| 5,878,400 A | 3/1999 | Carter, III |
| 5,953,710 A | 9/1999 | Fleming |
| 5,987,425 A | 11/1999 | Hartman et al. |
| 6,061,660 A | 5/2000 | Eggleston et al. |
| 6,088,451 A | 7/2000 | He et al. |
| 6,102,287 A | 8/2000 | Matyas, Jr. |

(Continued)

FOREIGN PATENT DOCUMENTS

| | | |
|---|---|---|
| CN | 1502186 | 6/2004 |
| CN | 1589424 | 3/2005 |

(Continued)

OTHER PUBLICATIONS

"Contactless Loyalty Scheme Gets Boost From Deal with Acquirer", Retrieved from <http://www.nfctimes.com/news/contactless-loyalty-scheme-qets-boost-deal-acquirer> on Oct. 20, 2010, (Aug. 17, 2010), 7 pages.

(Continued)

*Primary Examiner* — Shewaye Gelagay
*Assistant Examiner* — Carlton Johnson
(74) *Attorney, Agent, or Firm* — Dan Choi; Micky Minhas

(57) ABSTRACT

Secure element authentication techniques are described. In implementations, a confirmation is received that an identity of a user has been physically verified using one or more physical documents. One or more credentials that are usable to authenticate the user are caused to be stored in a secure element of a mobile communication device of the user, the secure element implemented using tamper-resistant hardware.

29 Claims, 10 Drawing Sheets

(56) References Cited

U.S. PATENT DOCUMENTS

| | | | |
|---|---|---|---|
| 6,372,331 B1 | 4/2002 | Terada et al. | |
| 6,615,171 B1 | 9/2003 | Kanevsky et al. | |
| 6,711,263 B1 | 3/2004 | Nordenstam et al. | |
| 6,754,833 B1 | 6/2004 | Black et al. | |
| 6,766,454 B1* | 7/2004 | Riggins | 713/185 |
| 6,883,718 B1 | 4/2005 | Le et al. | |
| 6,932,270 B1 | 8/2005 | Fajkowski | |
| 7,257,545 B1 | 8/2007 | Hung | |
| 7,388,957 B2 | 6/2008 | Ono et al. | |
| 7,437,329 B2 | 10/2008 | Graves | |
| 7,463,898 B2 | 12/2008 | Bayne | |
| 7,600,676 B1 | 10/2009 | Rados et al. | |
| 7,628,322 B2 | 12/2009 | Holtmanns et al. | |
| 7,647,243 B2 | 1/2010 | Woolston | |
| 7,647,430 B2 | 1/2010 | Ng et al. | |
| 7,769,633 B2 | 8/2010 | Jokinen | |
| 7,774,238 B2 | 8/2010 | Gopalpur et al. | |
| 7,805,379 B1 | 9/2010 | Adkins, III et al. | |
| 7,840,494 B2 | 11/2010 | Wiederin | |
| 7,996,331 B1 | 8/2011 | Solanki et al. | |
| 8,484,708 B2* | 7/2013 | Chern | H04L 9/3271 713/155 |
| 8,805,434 B2 | 8/2014 | Vasudevan | |
| 9,026,171 B2 | 5/2015 | Vasudevan | |
| 2001/0042010 A1 | 11/2001 | Hassell | |
| 2002/0065713 A1 | 5/2002 | Awada | |
| 2002/0080968 A1 | 6/2002 | Olsson | |
| 2002/0087876 A1 | 7/2002 | Larose | |
| 2002/0123938 A1 | 9/2002 | Yu et al. | |
| 2002/0146125 A1 | 10/2002 | Eskicioglu et al. | |
| 2002/0150243 A1 | 10/2002 | Craft et al. | |
| 2003/0028469 A1 | 2/2003 | Bergman et al. | |
| 2003/0061111 A1 | 3/2003 | Dutta et al. | |
| 2003/0132284 A1 | 7/2003 | Reynolds et al. | |
| 2003/0204726 A1 | 10/2003 | Kefford et al. | |
| 2003/0208403 A1 | 11/2003 | Fisher et al. | |
| 2004/0068649 A1 | 4/2004 | Haller et al. | |
| 2004/0128197 A1 | 7/2004 | Bam et al. | |
| 2004/0193485 A1 | 9/2004 | Ilberg | |
| 2004/0206812 A1 | 10/2004 | Tamagno et al. | |
| 2004/0215963 A1 | 10/2004 | Kaplan | |
| 2004/0247115 A1 | 12/2004 | Ono et al. | |
| 2005/0015401 A1 | 1/2005 | Chang et al. | |
| 2005/0021982 A1 | 1/2005 | Popp et al. | |
| 2005/0111463 A1 | 5/2005 | Nepomuceno Leung et al. | |
| 2005/0125451 A1 | 6/2005 | Mooney | |
| 2005/0137889 A1* | 6/2005 | Wheeler | G06Q 20/045 705/65 |
| 2005/0137939 A1 | 6/2005 | Calabria et al. | |
| 2005/0154909 A1 | 7/2005 | Zhang et al. | |
| 2005/0157872 A1 | 7/2005 | Ono et al. | |
| 2005/0187873 A1 | 8/2005 | Labrou et al. | |
| 2005/0256778 A1 | 11/2005 | Boyd et al. | |
| 2005/0289047 A1 | 12/2005 | Oliver et al. | |
| 2006/0046842 A1 | 3/2006 | Mattice et al. | |
| 2006/0090081 A1 | 4/2006 | Baentsch et al. | |
| 2006/0091223 A1 | 5/2006 | Zellner et al. | |
| 2006/0179309 A1 | 8/2006 | Cross et al. | |
| 2006/0213972 A1 | 9/2006 | Kelley et al. | |
| 2006/0236363 A1* | 10/2006 | Heard | H04L 63/101 726/1 |
| 2007/0038523 A1 | 2/2007 | Komem et al. | |
| 2007/0043636 A1 | 2/2007 | Foster | |
| 2007/0075133 A1 | 4/2007 | Yeager | |
| 2007/0095927 A1 | 5/2007 | Pesonen et al. | |
| 2007/0107050 A1 | 5/2007 | Selvarajan | |
| 2007/0156555 A1 | 7/2007 | Orr | |
| 2007/0180276 A1 | 8/2007 | Everett et al. | |
| 2007/0190939 A1 | 8/2007 | Abel | |
| 2007/0197261 A1 | 8/2007 | Humbel | |
| 2007/0235539 A1 | 10/2007 | Sevanto et al. | |
| 2007/0254712 A1 | 11/2007 | Chitti | |
| 2007/0278291 A1 | 12/2007 | Rans et al. | |
| 2008/0011837 A1 | 1/2008 | Wesley | |
| 2008/0033866 A1 | 2/2008 | Boswell et al. | |
| 2008/0039134 A1 | 2/2008 | Hattori et al. | |
| 2008/0052233 A1 | 2/2008 | Fisher et al. | |
| 2008/0116264 A1 | 5/2008 | Hammad et al. | |
| 2008/0126145 A1 | 5/2008 | Rackley, III et al. | |
| 2008/0189192 A1 | 8/2008 | Ronen et al. | |
| 2008/0208741 A1 | 8/2008 | Arthur et al. | |
| 2008/0215636 A1* | 9/2008 | Lofgren et al. | 707/200 |
| 2008/0248815 A1 | 10/2008 | Busch | |
| 2008/0255942 A1 | 10/2008 | Craft | |
| 2008/0262928 A1 | 10/2008 | Michaelis | |
| 2008/0270251 A1 | 10/2008 | Coelho et al. | |
| 2008/0280644 A1 | 11/2008 | Hugot | |
| 2008/0309451 A1 | 12/2008 | Zellweger et al. | |
| 2009/0036103 A1 | 2/2009 | Byerley et al. | |
| 2009/0037287 A1 | 2/2009 | Baitalmal et al. | |
| 2009/0097637 A1* | 4/2009 | Boscher | G06F 7/723 380/28 |
| 2009/0191811 A1 | 7/2009 | Griffin et al. | |
| 2009/0192937 A1 | 7/2009 | Griffin et al. | |
| 2009/0193264 A1 | 7/2009 | Fedronic et al. | |
| 2009/0198997 A1 | 8/2009 | Yeap et al. | |
| 2009/0204806 A1* | 8/2009 | Kanemura | G06F 21/10 713/155 |
| 2009/0205028 A1 | 8/2009 | Smeets et al. | |
| 2009/0234861 A1 | 9/2009 | Ramer et al. | |
| 2009/0265555 A1* | 10/2009 | Royer | G06F 21/32 713/168 |
| 2009/0270045 A1 | 10/2009 | Flaherty | |
| 2009/0271850 A1 | 10/2009 | Hoppe et al. | |
| 2009/0281947 A1 | 11/2009 | Erel | |
| 2009/0307132 A1 | 12/2009 | Phillips | |
| 2009/0312011 A1 | 12/2009 | Huomo et al. | |
| 2009/0325565 A1 | 12/2009 | Backholm | |
| 2010/0010994 A1 | 1/2010 | Wittig et al. | |
| 2010/0042517 A1 | 2/2010 | Paintin et al. | |
| 2010/0042954 A1 | 2/2010 | Rosenblatt et al. | |
| 2010/0048226 A1 | 2/2010 | Owen et al. | |
| 2010/0049599 A1 | 2/2010 | Owen et al. | |
| 2010/0057573 A1 | 3/2010 | Singhal | |
| 2010/0069096 A1 | 3/2010 | Poola | |
| 2010/0070364 A1 | 3/2010 | Dugan | |
| 2010/0106583 A1 | 4/2010 | Etheredge et al. | |
| 2010/0125495 A1 | 5/2010 | Smith et al. | |
| 2010/0125510 A1 | 5/2010 | Smith et al. | |
| 2010/0146119 A1 | 6/2010 | Lee | |
| 2010/0153447 A1 | 6/2010 | Johnson et al. | |
| 2010/0163618 A1 | 7/2010 | Yang et al. | |
| 2010/0174598 A1 | 7/2010 | Khan et al. | |
| 2010/0280911 A1 | 11/2010 | Roberts et al. | |
| 2010/0317336 A1 | 12/2010 | Ferren et al. | |
| 2011/0010234 A1 | 1/2011 | Lindelsee et al. | |
| 2011/0078773 A1* | 3/2011 | Bhasin | H04L 63/0838 726/5 |
| 2011/0276484 A1* | 11/2011 | Pearson | G06Q 20/38 705/44 |
| 2011/0305337 A1* | 12/2011 | Devol | G06F 21/305 380/259 |
| 2012/0084138 A1 | 4/2012 | Anantha | |
| 2012/0089404 A1 | 4/2012 | Rao | |
| 2012/0089450 A1 | 4/2012 | Anantha | |
| 2012/0099727 A1 | 4/2012 | Marshall | |
| 2012/0109771 A1 | 5/2012 | Zargahi | |
| 2012/0129493 A1 | 5/2012 | Vasudevan | |
| 2012/0143669 A1 | 6/2012 | Anantha | |
| 2012/0143758 A1 | 6/2012 | Anantha | |
| 2012/0143769 A1 | 6/2012 | Krishnan | |
| 2012/0196529 A1 | 8/2012 | Huomo et al. | |
| 2013/0138571 A1 | 5/2013 | Vassilev et al. | |
| 2014/0286492 A1 | 9/2014 | Vasudevan | |

FOREIGN PATENT DOCUMENTS

| | | |
|---|---|---|
| CN | 1645791 | 7/2005 |
| CN | 1757219 | 4/2006 |
| CN | 1930592 | 3/2007 |
| CN | 1934545 | 3/2007 |
| CN | 1947343 | 4/2007 |
| CN | 1988549 | 6/2007 |

(56) References Cited

FOREIGN PATENT DOCUMENTS

| | | |
|---|---|---|
| CN | 101064033 | 10/2007 |
| CN | 101304503 | 11/2008 |
| CN | 101341517 | 1/2009 |
| CN | 101576983 | 11/2009 |
| CN | 101657784 | 2/2010 |
| CN | 101657984 | 2/2010 |
| CN | 101681480 | 3/2010 |
| KR | 20070092773 | 9/2007 |
| KR | 20070120125 | 12/2007 |
| KR | 20080006694 | 1/2008 |
| TW | 200919354 | 5/2009 |
| WO | WO 2006031202 | 3/2006 |
| WO | WO-2010039337 | 4/2010 |
| WO | WO-2010079483 | 7/2010 |

OTHER PUBLICATIONS

"Download Blaze Mobile Wallet for Mobile", Retrieved from: <http://www.getjar.com/mobile/18367/blaze-mobile-wallet/> on Oct. 19, 2010, (Jan. 28, 2010), 2 pages.

"FidBook, the first NFC application enabling easy-load loyalty cards on a NFC phone is launched in Nice.", Retrieved from: <http://krowne.wordpress.com/2010/06/04/fidbook-the-first-nfc-application-enabling-easy-load-loyalty-cards-on-a-nfc-phone-is-launched-in-nice/> on Oct. 22, 2010, (Jun. 4, 2010), 6 pages.

"Final Office Action", U.S. Appl. No. 12/909,178, (Dec. 10, 2012), 10 pages.

"Final Office Action", U.S. Appl. No. 12/952,754, (Dec. 6, 2012), 13 pages.

"Final Office Action", U.S. Appl. No. 12/958,773, (Aug. 29, 2012), 21 pages.

"Financial Forecast Center", Retrieved from: <http://www.forecasts.org/exchange-rate/> on Aug. 29, 2012, 4 pages.

"Fresh Ideas for Building Profitable Customer Relationships", Retrieved from: <http://www.customerinsightgroup.com/loyaltyblog/> on Aug. 27, 2010, (Aug. 18, 2010), 16 pages.

"G&D's New Card Innovation on Display", Retrieved from: <http://www.gi-de.com/pls/portal/maia.display__custom_items.Download_File_BLOB?p_ID=139208&p_page_id=123329 &p_pg_id=44> on Oct. 22, 2010, (2007), pp. 1-12.

"Get Mobile Coupons Through Your Android Phone With Local Search", available at <http://androidandme.com/2009/11/news/get-mobile-coupons-throuqh-your-android-phone-with-local-search/>, (Nov. 24, 2009), 7 pages.

"GoMo Mobile Wallet", Retrieved from: <http://www.marketwire.com/press-release/GoMo-Wallet-Delivers-New-Class-Mobile-Commerce-Functionality-That-Changes-Transaction-1276550.htm> on Oct. 19, 2010, (Jun. 15, 2010), 2 pages.

"Mobile Phones to Open Doors: Philips and SK Telecom Launch NFC RFID Trial in Seoul", Retrieved ffrom: <http://www.itu.int/ITU-D/cyb/newslog/Mobile+Phones+To +Open+Doors+Philips+And+SK+Telecom+Launch+NFC+RFID+Trial+In+Seoul.aspx> on Oct. 19, 2010, (May 27, 2006), 3 pages.

"MobiQpons launches Free Service for Small Businesses to increase loyalty and repeat customers", Retrieved from: <http://www.prlog.org/10696328-mobiqpons-launches-free-service-for-small-businesses-to-increase-loyalty-and-repeat-customers.html> on Oct. 20, 2010, (May 24, 2010), 2 pages.

"Non-Final Office Action", U.S. Appl. No. 12/909,178, (Aug. 3, 2012), 12 pages.

"Non-Final Office Action", U.S. Appl. No. 12/917,178, (Sep. 12, 2012), 36 pages.

"Non-Final Office Action", U.S. Appl. No. 12/917,196, (Nov. 5, 2012), 24 pages.

"Non-Final Office Action", U.S. Appl. No. 12/952,754, (Sep. 12, 2012), 11 pages.

"Non-Final Office Action", U.S. Appl. No. 12/958,173, (Dec. 19, 2012), 10 pages.

"Non-Final Office Action", U.S. Appl. No. 12/958,773, (Jul. 27, 2012), 18 pages.

"PCT Search Report and Written Opinion", Application No. PCT/US2011/052782, (Mar. 27, 2012), 11 pages.

"PCT Search Report and Written Opinion", Application No. PCT/US2011/061731, (May 10, 2012), 9 pages.

"PDA Phone Smartcard-reader combines Contact and Contactless technology & transfer data via GPRS", *Fifth Media Sdn. Bhd.*, Available at <http://www.fifthmedia.biz/NFC07.pdf>,(2009), 2 pages.

"Proximity Mobile Payments: Leveraging NFC and the Contactless Financial Payments Infrastructure", *Smart Card Alliance White Paper*, Available at <http://www.smartcardalliance.org/resources/lib/Proximity_Mobile_Payments_200709.pdf>,(Sep. 2007), 39 Pages.

"Publishing Your Applications", Retrieved from: <http://develolper.android.com/guide/publishing/publishing.html> on Sep. 6, 2010, (Aug. 23, 2010), 4 pages.

"Restriction Requirement", U.S. Appl. No. 12/958,773, (Jun. 7, 2012), 6 pages.

"Roamware's Macalla Platform", Roamware, Inc., Available at <http://www.mobilemoneyexchange.org/Files/242ee787>,(Nov. 2009), 2 pages.

"Simfonie Mobile Payments", GFG Group, Available at <http://www.gfg-group.com/downloads/gfg_simfonie_product_brochure.pdf>,(2010), 4 pages.

"Smart Cards (Flexible Display)", Retrieved from: <http://www.citala.com/index.php/Application-Solutions/Smart-Cards.html> on Oct. 22, 2010, 2 pages.

"The Bump App for iPhone and Android", Retrieved from: <http://bu.mp/> on Oct. 28, 2010, Bump Technologies, Inc.,(2010), 1 page.

"The Mobile Wallet", Quirk eMarketing, Mobile Marketing 101, Chapter 9, Available at <http://www.quirk.biz/cms/3259.quirk_emarketing_mobile_marketing101_ch9.pdf>,(Oct. 19, 2010), pp. 1-10.

"Transfer pricing", Retrieved from: <http://www.deloitte.com/view/en_Nz/nz/services/tax-services/transfer-pricing/> on Oct. 12, 2010, (2010), 2 pages.

"ViVOtech Launches ViVOpay 8100—A Cost Effective PCI 2.1-Certified PIN pad, Mobile Loyalty, Mag-Stripe & NFC Payment Device for Small and Medium Sized Merchants", Retrieved from: <http://www.smartcardalliance.org/articles/2010/04/13/vivotech-launches-vivopay-8100-a-cost-effective-pci-2-1-certified-pin-pad-mobile-loyalty-mag-stripe-nfc-payment-device-for-small-and-medium-sized-merchants> on Oct. 20, 2010, (Apr. 13, 2010), 2 pages.

"Zinio Introduces International Pricing Management System for Publishers and their Global Licensees", Retrieved from: <http://in.zinio.com/press/press-release.isp?pressreleaseid=pr148100> on Oct. 12, 2010, (Sep. 17, 2010), 2 pages.

Alvarez, Mark "Apple's iKey Will Put Your Keys on Your Phone", Retrieved from: <http://www.atelier-us.com/mobile-wireless/article/apples-ikey-will-put-your-house-keys-on-your-phone> on Oct. 19, 2010, (Mar. 9, 2010), 2 pages.

Benson, Carol C., "Wallets and Stickers and Phones, Oh My!—A Look at Blaze Mobile", Retrieved from: <http://paymentsviews.com/2009/07/15/blaze-mobile/> on Aug. 27, 2010 (Jul. 15, 2009), 7 pages.

Billich, Christopher "The insider's Guide to Mobile Web Marketing in Japan", Retrieved from: <http://mobithinking.com/quide-mobile-Web-Japan> on Aug. 27, 2010, (2010), 6 pages.

Clark, Sarah, "Canadian mobile operators 'plan to introduce NFC or contactless handsets within the year", Retrieved from: <http://www.nearfieldcommunicationsworld.com/2010/02/17/32839/canadian-mobile-operators-plan-to-introduce-nfc-or-contactless-handsets-within-the-year/> on Oct. 19, 2010, (Feb. 17, 2010), 3 pages.

Clark, Sarah "Orange and Valeo demonstrate NFC car key concept", Retrieved from: <http://www.nearfieldcommunicationsworld.com/2010/10/07/34592/orange-and valeo-demonstrate-nfc-car-key-concept/> on Oct. 19, 2010, (Oct. 7, 2010), 1 page.

Conneally, Tim "Windows Phone Marketplace to include private app distribution, shareware modes", Retrieved from: <http://www.

(56) References Cited

OTHER PUBLICATIONS betanews.com/article/Windows-Phone-Marketplace-to-include-private-app-distribution-shareware-modes/1276026026> on Sep. 6, 2010 (Jun. 8, 2010), 1 page.

Cooke, John "Flexible display in your smart card anyone?", Retrieved from: <http://www.cocatalyst.com/blog/index.php/2008/06/28/flexible-display-in-your-smart-card-anyone/> on Oct. 22, 2010, (Jun. 28, 2008), 4 pages.

Davies, Chris "MasterCard trialling smart credit cards with display & keypads", Retrieved from: <http://gigaom.com/2010/08/20/visa-testing-nfc-memory-cards-for-wireless-payments/> on Oct. 22, 2010, (Aug. 20, 2008), 12 pages.

Dixon, Matt "Future iPhoneto Unlock doors", Retrieved from: <http://top10.com/mobilephones/news/2010/03/iphone_to_unlock_doors/> on Oct. 19, 2010, (Mar. 10, 2010), 3 pages.

Ekberg, Jan-Erik et al., "On-board Credentials with Open Provisioning", *NOKIA Research Center, NRC-TR-2008-007*, Available at <http://research.nokia.com/files/NRCTR2008007.pdf>,(Aug. 29, 2008), 18 pages.

Gu, Huanyu et al., "Car Key", Retrieved from: <http://www.autofocusasia.com/electrical_electronics/car_key_tody.htm> on Oct. 19, 2010, (2008), 5 pages.

Hardawar, Devindra "Verizon bets $400K on mobile loyalty card startup CardStar", Retrieved from: <http://www.reuters.com/article/idUS388514646320100821> on Oct. 20, 2010 (Aug. 21, 2010), 3 pages.

Kats, Rimma "Mobile Spinach introduces mobile coupons that never expire", Retrieved from: <http://www.mobilecommercedaily.com/mobile-spinach-introduces-mobile-coupons-that-do-not-expire/> on Oct. 20, 2010, (Jun. 8, 2010), 2 pages.

Lopez-De-Ipina, Diego et al., "Touch Computing: Simplifying Human to Environment Interaction through NFC Technology", Faculty of Engineering (Eside), University of Duesto, Available at <http://paginaspersonales.deusto.es/dipina/publications/dipinaJornadasRFID-NFC.pdf>,(Nov. 2007), 12 pages.

Maguire, Adam "Deal paves way for customer loyalty schemes", Retrieved from: <http://www.irishtimes.com/newspaper/finance/2010/0813/1224276713080.html> on Oct. 20, 2010 (Aug. 13, 2010), 6 pages.

McCarthy, Barry "The Risks and Opportunities in a Mobile Commerce Economy", *A First Data White Paper*, Available at <http://www.star-systems.com/downloads/thought-leadership/fd_mobilecommerceoverview_whitepaper.pdf>,(2008), 13 pages.

Okoegwale, Emmanuel "Mobile Money Service Provider Profiles", Retrieved from: <http://www.developingtelecoms.com/mobile-money-service-provider-profiles.html> on Oct. 19, 2010, (Jun. 25, 2009), 5 pages.

Olsen, Richard "Pricing in the FX Marketplace© ", Olsen Ltd., Available at <http://mediaserver.fxstreet.com/Reports/ec6a8d2d-bbb6-412f-90f7-8a91ce0716f7/0a1df9c0-187f-4151-9785-5ef8ff4467cd.pdf>,(May 21, 2010), pp. 1-8.

Shankar, Venkatesh et al., "Mobile Marketing in the Retailing Environment: Current Insights and Future Research Avenues", *The Journal of Interactive Marketing—Draft*, available at <http://www.crito.uci.edu/papers/2010/MobileMarketing.pdf>,(Feb. 2010), pp. 1-29.

Whitney, Lance "Apple files patent for Passbook coupons with a touch of NFC", downloaded at >>http://news.cnet.com/8301-13579_3-57560263-37/apple-files-patent-for-passbook-coupons-with-a-touch-of-nfc/<< on Dec. 21, 2012, (Dec. 20, 2012), 2 pages.

Wray, Jeffrey A., "Mobile Advertising Engine", *A Senior Research Paper, Stetson University, Spring Term 2009*, available at <http://www2.stetson.edu/mathcs/people/students/research/pdf/2008/jwray/final.pdf>,(2009), 52 pages.

Ziegler, Chris "Windows Phone Marketplace for Windows Phone 7 Series unveiled", Retrieved from: <http://www.engadget.com/2010/03/15/windows-phone-marketplace-for-windows-phone-7-series-unveiled/> on Sep. 6, 2010, (Mar. 15, 2010), 3 pages.

"MobileID A mobile, two-way and two-factor authentication", Retrieved at <<http://www.deepnetsecurity.com/products2/mobileid.asp>> Retrieved Date Aug. 30, 2010, pp. 2.

Kaviani, et al., "A Two-factor Authentication Mechanism Using Mobile Phones", Retrieved at <<http://lersse-dl.ece.ubc.ca/record/163/files/163.pdf>>Aug. 20, 2008, pp. 27.

"FireID Launches Mobile Two-Factor Authentication Platform for Online and Mobile Banking", Retrieved at <<http://www.darkreading.com/insiderthreat/security/client/showArticle.jhtml?articleID=223900289>> Mar. 17, 2010, pp. 3.

Naumann, et al., "Security Issues in the Context of Authentication Using Mobile Devices (Mobile eID)", Retrieved at <<http://www.enisa.europa.eu/act/it/eid/mobile-eid/at_download/fullReport>> Version: 1.0.1, Nov. 21, 2008, pp. 1-24.

Klenk, et al., "Preventing Identity Theft with Electronic Identity Cards and the Trusted Platform Module", Retrieved at <<http://www.net.in.tum.de/fileadmin/bibtex/publications/papers/klenk_eurosec2009.pdf>> In the Proceedings of the Second European Workshop on System Security, Mar. 31-31, 2009, pp. 8.

"Final Office Action", U.S. Appl. No. 12/917,178, (Mar. 26, 2013), 37 pages.

"Non-Final Office Action", U.S. Appl. No. 12/898,131, (Jan. 4, 2013), 25 pages.

"Non-Final Office Action", U.S. Appl. No. 12/898,131, (Feb. 14, 2013), 24 pages.

"Non-Final Office Action", U.S. Appl. No. 12/899,861, (Jan. 7, 2013), 22 pages.

"Non-Final Office Action", U.S. Appl. No. 12/958,841, (Jan. 9, 2013), 24 pages.

"Starbucks Card Mobile App", Retrieved from <http://web.archive.org/web/20100303042234/http://www.starbucks.com/coffeehouse/mobileapps/starbucks-card-mobile> on Dec. 19, 2012, (Mar. 2, 2010), 9 pages.

Nash, Kim S., "Follow the Money", Nash, Kim S., Follow the Money, Dec. 1, 2009, pp. 26-32, (Dec. 1, 2009), 6 pages.

"Final Office Action", U.S. Appl. No. 12/898,131, (Apr. 12, 2013), 31 pages.

"Final Office Action", U.S. Appl. No. 12/899,861, (May 10, 2013), 27 pages.

"Final Office Action", U.S. Appl. No. 12/917,196, (May 15, 2013), 31 pages.

"Final Office Action", U.S. Appl. No. 12/958,173, (Jun. 4, 2013), 15 pages.

"Final Office Action", U.S. Appl. No. 12/958,841, (May 24, 2013), 24 pages.

"My Starbucks Rewards—Examiner's Digital Loyalty Reward Account Summary", Retrieved from <http://www.starbucks.com/account/rewards> on Apr. 24, 2013, (Apr. 24, 2013), 1 page.

"My Starbucks Rewards", Retrieved from <http://web.archive.org/web/20101130202420/https://www.starbucks.com/card/rewards>on May 24, 2013, (Nov. 30, 2010), 11 pages.

"Final Office Action", U.S. Appl. No. 12/899,861, Feb. 14, 2014, 30 pages.

"Final Office Action", U.S. Appl. No. 12/917,178, Feb. 11, 2014, 45 pages.

"Foreign Office Action", CN Application No. 201110310747.3, Jan. 8, 2014, 12 Pages.

"Foreign Office Action", CN Application No. 201110415260.1, Feb. 11, 2014, 17 Pages.

"Notice of Allowance", U.S. Appl. No. 12/952,754, Feb. 20, 2014, 8 pages.

"Foreign Office Action", CN Application No. 201110392619.8, Nov. 5, 2013, 12 Pages.

"Foreign Office Action", CN Application No. 201110314187.9, Dec. 19, 2013, 13 pages.

"Foreign Office Action", CN Application No. 201110340395.6, Nov. 22, 2013, 15 Pages.

"Non-Final Office Action", U.S. Appl. No. 12/958,841, Nov. 7, 2013, 25 pages.

"Ex Parte Quayle Action", U.S. Appl. No. 12/958,173, Jan. 3, 2014, 4 pages.

"Final Office Action", U.S. Appl. No. 12/952,754, Dec. 13, 2013, 8 pages.

(56) References Cited

OTHER PUBLICATIONS

"Ex Parte Quayle Action", U.S. Appl. No. 12/958,173, (Aug. 29, 2013), 5 pages.
"Non-Final Office Action", U.S. Appl. No. 12/899,861, (Aug. 15, 2013), 30 pages.
"Non-Final Office Action", U.S. Appl. No. 12/917,178, (Jul. 25, 2013), 39 pages.
"Non-Final Office Action", U.S. Appl. No. 12/952,754, (Jul. 15, 2013),13 pages.
"Final Office Action", U.S. Appl. No. 12/958,841, May 8, 2014, 26 pages.
"Foreign Notice of Allowance", CN Application No. 201110415281.3, Aug. 27, 2014, 4 pages.
"Foreign Office Action", AU Application No. 2011312591, Jun. 16, 2014, 4 pages.
"Foreign Office Action", CN Application No. 201110310747.3, Sep. 15, 2014, 9 Pages.
"Foreign Office Action", CN Application No. 201110314187.9, Aug. 26, 2014, 15 Pages.
"Foreign Office Action", CN Application No. 201110317879.9, Jan. 6, 2014, 7 pages.
"Foreign Office Action", CN Application No. 201110317879.9, Aug. 29, 2014, 7 Pages.
"Foreign Office Action", CN Application No. 201110340395.6, Jul. 8, 2014, 11 pages.
"Foreign Office Action", CN Application No. 201110358418.6, Apr. 15, 2014, 12 Pages.
"Foreign Office Action", CN Application No. 201110392619.8, May 14, 2014, 9 Pages.
"Foreign Office Action", CN Application No. 201110415260.1, Sep. 2, 2014, 15 pages.
"Foreign Office Action", CN Application No. 201110415281.3, Jan. 17, 2014, 15 pages.
"Foreign Office Action", CN Application No. 201110415296.X, Jun. 27, 2014, 12 pages.
"Non-Final Office Action", U.S. Appl. No. 12/898,131, May 13, 2014, 29 pages.
"Non-Final Office Action", U.S. Appl. No. 12/909,178, Oct. 3, 2014, 12 pages.
"Non-Final Office Action", U.S. Appl. No. 12/917,178, May 29, 2014, 48 pages.
"Non-Final Office Action", U.S. Appl. No. 12/958,173, Apr. 23, 2014, 10 pages.
"Non-Final Office Action", U.S. Appl. No. 12/958,841, Aug. 28, 2014, 30 pages.
"Notice of Allowance", U.S. Appl. No. 14/296,334, Sep. 15, 2014, 6 pages.
Zhou, "Transportation Card Enter Into Campus Management of Consumption", YINDA Electronic Engineering Company, (Golden Card Project) Issue 8, p. 32-33, Aug. 31, 2001, 3 pages.
"Final Office Action", U.S. Appl. No. 12/958,173, Oct. 15, 2014, 7 pages.
"Foreign Office Action", AU Application No. 2011312591, Sep. 19, 2014, 5 pages.
"Foreign Office Action", CN Application No. 201110409174.X, Aug. 4, 2014, 12 pages.
"Near field communication", Retrieved from <http://en.wikipedia.org/wiki/Near_field_communication> on Oct. 8, 2014, 16 pages.
"Top 10 reasons why you should be a part of My Starbucks Rewards", Jul. 18, 2010, 3 pages.
"Foreign Office Action", CN Application No. 201110415260.1, Dec. 3, 2014, 10 Pages.
"Foreign Office Action", CN Application No. 201110392619.8, Nov. 27, 2014, 6 Pages.
Negishi, "Long before Apple Pay, Japan had "Mobile Wallet"", retrieved from <http://blogs.wsj.com/japanrealtime/2014/09/11/long-before-apple-pay-japan-had-mobile-wallet/> on Dec. 8, 2014, Sep. 11, 2014, 5 pages.
"Final Office Action", U.S. Appl. No. 12/909,178, May 7, 2015, 14 pages.
"Foreign Office Action", CN Application No. 201110310747.3, Mar. 26, 2015, 10 pages.
"Foreign Office Action", CN Application No. 201110317879.9, Mar. 13, 2015, 7 Pages.
"Foreign Office Action", CN Application No. 201110340395.6, Jan. 12, 2015, 13 pages.
"Foreign Office Action", CN Application No. 201110409174.X, Apr. 27, 2015, 8 Pages.
"Foreign Office Action", CN Application No. 201110415296.X, Jan. 5, 2015, 8 pages.
"baiMobile Framework for Secure Credentials for iOS and Android", Biometric Associates, LP—Retrieved at: https://www.biometricassociates.com/smart-card-framework/ on Jun. 15, 2015, 3 pages.
"baiMobile® 3000 MP Bluetooth Smart Card Reader", Biometric Associates, LP—Retrieved at: https://www.biometricassociates.com/products/smart-card-readers/3000mp-reader/ on Jun. 15, 2015, 4 pages.
"Contactless Mobile Payment Architecture Overview", Version 1.0 - EMVCo Contactless Mobile Payment, Jun. 2010, 28 Pages.
"DoD Common Access Card (CAC)", Retrieved at: http://www.cac.mil/common-access-card/ on Jun. 15, 2015, 3 pages.
"DoD Implementation Guide for CAC PIV End-Point", Card Technologies & Identity Solutions Division (CTIS)—Retrieved at: http://www.cac.mil/docs/ref1.c.i-CAC_End-Point_Implementation_Guide_v1-22.pdf, Jul. 10, 2008, 47 pages.
"EMV Mobile Contactless Payment—Technical Issues and Position Paper", Version 1.0, Oct. 2007, 37 pages.
"EMVCo Handset Requirements for Contactless Mobile Payment", EMV Contactless Mobile Payment—Version 1.0, Jun. 2010, 20 pages.
"Foreign Notice of Allowance", CN Application No. 201110392619.8, May 6, 2015, 4 Pages.
"Foreign Office Action", CN Application No. 201110358418.6, Jul. 3, 2015, 8 Pages.
"Foreign Office Action", CN Application No. 201110415296.X, Jun. 15, 2015, 8 Pages.
"iPad & iPhone PKard® Reader Bundles", Retrieved at: http://www.thursby.com/products/pkard-reader on Jun. 15, 2015, 5 pages.
"Mobile Phone Work Group—Selected Use Case Analyses v1.0", Trusted Computing Group—Retrieved at: www.trustedcomputinggroup.org/files/resource_files/878E30CD-1D09-3519-ADD093FFF2027E2B/Selected_Use_Case_Analyses_v1.0_Executive_Summary.pdf, 2009, 1 page.
"Smart ID Systems", Retrieved at: https://web.archive.org/web/20090704081836/http:/www.biometricassociates.com/ on Jun. 15, 2015, Jul. 4, 2009, 1 page.
"TCG Mobile Reference Architecture—Specification version 1.0", Revision 1—Retrieved at: www.trustedcomputinggroup.org/files/temp/644597BE-1D09-3519-AD5ADDAFA0B539D2/MPWG%20tcg-mobile-reference-architecture-1.pdf, Jun. 12, 2007, 87 pages.
"The BAL Authenticator Smart Card", Biometric Associates, LP—Retrieved at: https://web.archive.org/web/20090718213643/http:/www.biometricassociates.com/smartcard.php on Jun. 15, 2015, Jul. 18, 2009, 2 pages.
"Thursby Software: ADmitMac for CAC—A secure integration of DOD CAC for Macintosh", Retrieved at: https://web.archive.org/web/20090217222710/http:/www.thursby.com/products/afc.html on Jun. 15, 2015, Feb. 17, 2009, 2 pages.
"Trusted Platform Modules Strengthen User and Platform Authenticity", Trusted Computing Group—Retrieved at: www.trustedcomputinggroup.org/files/resource_files/8D46621F-1D09-3519-ADB205692DBBE135/Whitepaper_TPMs_Strengthen_User_and_Platform_Authenticity_Final_1_0.pdf, Jan. 2005, 8 pages.
"U.S. Department of Defense Common Access Card", Smart Card Alliance—Retrieved at: www.smartcardalliance.org/resources/lib/DoD_CAC_Profile.pdf, 2005, 2 pages.
Ardiley,"History of the Common Access Card (CAC)", Retrieved at: http://www.securityinfowatch.com/article/10653434/history-of-the-common-access-card-cac, Mar. 19, 2012, 4 pages.

(56) References Cited

OTHER PUBLICATIONS

"Final Office Action", U.S. Appl. No. 12/958,773, Dec. 29, 2014, 18 pages.
"Foreign Office Action", CN Application No. 201110358418.6, Dec. 31, 2014, 12 Pages.
"Identification cards—Physical Characteristics", ISO/IEC FCD 7810, Jun. 13, 2002, 16 pages.
"Non-Final Office Action", U.S. Appl. No. 12/917,178, Dec. 23, 2014, 47 pages.
"Non-Final Office Action", U.S. Appl. No. 12/917,196, Dec. 26, 2014, 31 pages.
"Notice of Allowance", U.S. Appl. No. 14/296,334, Dec. 31, 2014, 6 pages.

\* cited by examiner

SECURE ELEMENT AUTHENTICATION

BACKGROUND

Mobile communication devices such as wireless phones have become a common part in the everyday life of a wide variety of users. Consequently, the mobile communication device may serve as a primary point of contact for a variety of business and personal uses. For example, a business user may utilize the mobile communication device to receive email, a casual user may send text messages to friends, either one of the users may share pictures, and so on.

However, traditional techniques that were employed to securely store data on the mobile communication device as well as to communicate data to the mobile communication device could result in the data being "in the clear." Even if but for a brief moment in time, malicious parties may take advantage of this vulnerability to steal sensitive data. This may even result in the ability by the malicious party to access other information on the mobile communication device itself. Consequently, functionality of the mobile communication device may be limited from meeting its true potential due to the ability to compromise data on the mobile communication device.

SUMMARY

Secure element authentication techniques are described. In implementations, a confirmation is received that an identity of a user has been physically verified using one or more physical documents. One or more credentials that are usable to authenticate the user are caused to be stored in a secure element of a mobile communication device of the user, the secure element implemented using tamper-resistant hardware.

In one or more implementations, a challenge is received at a mobile communication device to authenticate an identity of a user of the mobile communication device. The challenge is processed by a secure element of the mobile communication device using one or more credentials, the challenge being processed without exposing the one or more credentials outside of hardware that implements the secure element. An answer to the challenge is exposed by the secure element.

In one or more implementations, a mobile communication device comprises a secure element implemented in tamper-resistant hardware that is configured to decrypt credentials using a private key included in the secure element and store the credentials once decrypted in the secure element, the credentials configured to authenticate a user of the mobile communication device for access to a resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile communication devices (e.g., wireless phones) are configured to provide a wide variety of functionality. However, data may be compromised on the mobile communication devices using traditional techniques. Therefore, the mobile communication device may not realize its true potential.

Secure element authentication techniques are described through use of a variety of different examples. In implementations, a secure element may be employed to authenticate an identity of a user. For example, the secure element may be implemented using tamper-resistant hardware, such as an integrated circuit secured to a printed circuit board that is to resistant snooping and removal from the board. The secure element may be configured to maintain credentials that are usable to authenticate an identity of a user. The credentials may be utilized in a variety of different ways to authenticate the user, such as communicated via a secure communication channel, usable to answer a challenge without exposing the credentials themselves, and so on. Further, authentication may be utilized for a variety of purposes, such as to access resources including an online account, serve as a signature to sign a document, and so on, further discussion of which may be found in relation to the following sections.

In the following discussion, a variety of example implementations of a mobile communication device (e.g., a wireless phone) are described. Additionally, a variety of different functionality that may be employed by the mobile communication device is described for each example, which may be implemented in that example as well as in other described examples. Accordingly, example implementations are illustrated of a few of a variety of contemplated implementations. Further, although a mobile communication device having one or more modules that are configured to provide telephonic functionality are described, a variety of other mobile devices are also contemplated, such as personal digital assistants, mobile music players, dedicated messaging devices, portable game devices, netbooks, and so on.

Example Environment

Figure 1:
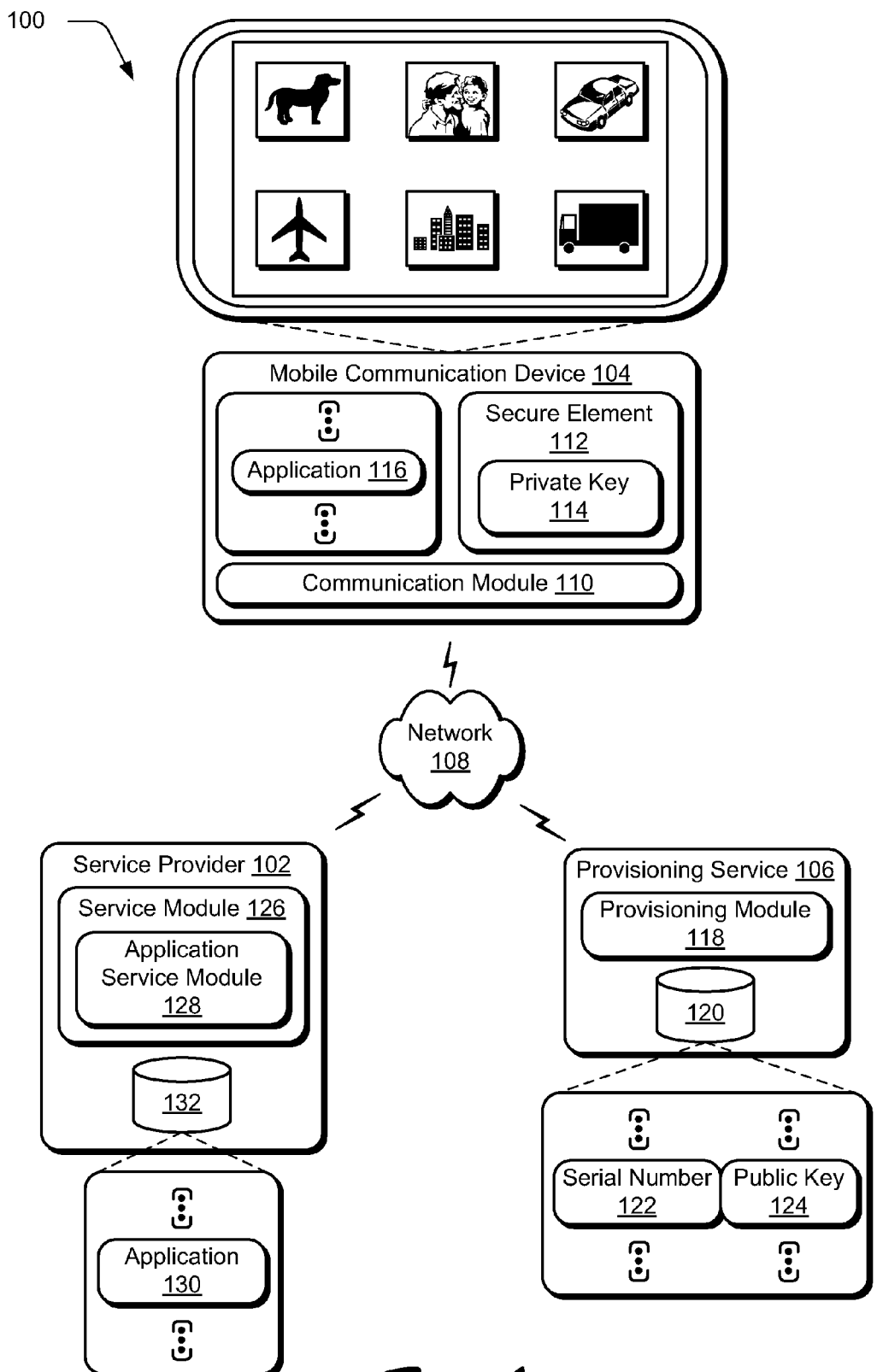
FIG. 1 is an illustration of an example implementation of a mobile communication device in accordance with one or more embodiments of devices, features, and systems for mobile communications.

FIG. 1 is an illustration of an example implementation of an environment 100 that is operable to employ the techniques described herein. The environment includes a service provider 102, a mobile communication device 104, and a provisioning service 106 that are illustrated as communicatively coupled, one to another, via a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The mobile communication device 104 is further illustrated as including a communication module 110. The communication module 110 is representative of functionality of the mobile communication device 102 to communicate via the network 108. For example, the communication module 110 may include telephone functionality to make and receive telephone calls, such as by employing a telephone module to communicate via a plain old telephone service (POTS), wireless network (e.g., cellular and/or Wi-Fi), and so on.

The communication module 110 may also include a variety of other functionality, such as to capture content, form short message service (SMS) text messages, multimedia messaging service (MMS) messages, emails, status updates to be communicated via a social network service or micro-blog, and so on. For instance, the communication module 110 may also support browser functionality to browse the network 108.

The mobile communication device 104 is further illustrated as including a secure element 112. In one or more implementations, the secure element 112 is representative of functionality to support secure communications with the mobile communication device 104. For example, the secure element 112 may be implemented using hardware and configured during manufacture to include a private key 114, securely provision later, and so on. For instance, the secure element 112 may be implemented using a tamper-resistant integrated circuit that is resistant to "snooping" as well as physical removal from the mobile communication device 104 by a manufacturer of the device. For example, the manufacturer may cover a surface-mounted integrated circuit with an epoxy that helps to prevent snooping of the circuit as well as causing the circuit to break if removal is attempted from a circuit board. Further, this manufacturing process may be auditable to ensure that the private key 114 is kept secret.

In implementations, the secure element 112 includes functionality to perform a variety of different options, such as encryption and/or decryption operations, store credentials, and so on. For example, the secure element 112 may use the private key 114 to perform a decryption operation and expose a result of the operation to other functionality of the mobile communication device 104, such as to one or more applications 116 that are executable by the mobile communication device 104.

In this example, the secure element 112 may receive data to be decrypted from the application 116, decrypt the data using the private key 114, and then expose a result of the decryption operation (i.e., the decrypted data) to the application 116. Therefore, inclusion of the private key 114 in the secure element 112 may help to protect the private key 114 from discovery "outside" the secure element 112 by keeping the private key 114 from being exposed in the clear during the decryption operation.

A variety of other functionality may also be supported through use of the secure element 112. For example, the secure element 112 may support a protected communication channel through the provisioning service 106. The provisioning service 106, for instance, may include a provisioning module 118 and storage 120. The storage 120 may be used to maintain a serial number 122 assigned to an integrated circuit that includes the secure element 112 and a corresponding public key 124 that forms an asymmetric public/private key pair with the private key 114 of the mobile communication device 104. The provisioning module 118 may thus provide the public key 124 to third-party services such that communication between the third-party service and the mobile communication device 104 is protected, even if that communication occurs using the provisioning service 106 or other service as an intermediary.

For example, a user of the mobile communication device 104 may interact with the communication module 110 or other functionality (e.g., an application 116) to navigate to a service provider 102 over the network 108. The service provider 102 as illustrated includes a service module 126 that is representative of functionality to provide one or more services for access via the network 108.

An example of one of these services is illustrated as implemented by an application service module 128. The application service module 128 is representative of functionality to manage dissemination of one or more applications 130 via the network 108. Although the applications 130 are illustrated as stored in storage 132 local to the service provider 102 (e.g., as part of a server farm that implements the service provider 102), the storage 132 may be representative of a wide variety of different types of storage, e.g., third party storage.

In an example, the application service module 138 manages a marketplace configured to provide applications 130 for purchase via the network 108. Therefore, a user of the mobile communication device 104 may access the marketplace to purchase one or more of the applications 130 for download to local storage, which is illustrated as application 116 in this example. To purchase and/or transport the application 130, the mobile communication device 104 and the service provider 102 may utilize secure communications implemented at least in part through use of the secure element 112. The secure communications may be implemented in a variety of ways.

In one instance, the public key 124 is provided to secure communications between the service provider 102 and the mobile communication device 104 directly. For example, the public key 124 may be located by the provisioning module 118 of the provisioning service 106 by obtaining a serial number 122 for the integrated circuit that implements the secure element 112, e.g., from the mobile communication device 104. The provisioning module 118 may then use the serial number 122 to locate the public key 124 and provide the public key 124 to the service provider 102. The public key 124 may then be used to encrypt data to be communicated to the mobile communication device 104, such as the application 130, billing information and other credentials, and so on.

In another instance, the provisioning service 106 provides the public key 124 to the service provider 102 as a basis to support indirect communications, such as to securely transport credentials and other data (e.g., cryptographic keys) that are to be used as a basis to form a communication channel. For example, the service provider 102 may provide credentials (e.g., other cryptographic keys) that are to be used to secure communications between the service provider 102 and the mobile communication device 104. To protect these credentials from compromise by malicious parties, the credentials may be encoded using this public key 124. In other words, the other cryptographic keys may be encrypted using the public key 124 for communication to the mobile communication device 104 to protect the other cryptographic keys from discovery by malicious parties.

In this way, regardless of whether the communication is communicated indirectly via the provisioning service 106 or directly via the network 108, the credentials (e.g., the other cryptographic keys) are protected from discovery through encryption using the public key 124. Therefore, even the provisioning service 106 itself is not able to determine "what" is being communicated between the service provider 102 and the mobile communication device 104.

The mobile communication device 104 may then decrypt the communication using the secure element 112, and more particularly the private key 114, to obtain the other cryptographic keys. A variety of different techniques may then be employed to utilize the other cryptographic keys once decrypted.

In one technique, the other cryptographic keys are exposed for use outside the secure element 112, such as by an application 116 or other functionality of the mobile communication device 104. Thus, in this techniques the secure element 112 is leveraged to provide the credentials that are used to serve as a basis to secure communications but is not used to secure the communications itself, i.e., to provide the actual encryption/decryption.

In another technique, the other cryptographic keys may be kept from being exposed outside the secure element 112 through storage within the secure element 112. The secure element 112 may then use the cryptographic keys as previously described to decrypt and/or encrypt data received by the secure element 112 without exposing the cryptographic keys "outside" the secure element 112. The secure element 112 may thus employ a variety of different techniques to secure communications with the mobile communication device 104, the example of the service provider 102 above being but one of many such examples.

Additionally, the secure element 112 may be used to obtain a variety of other credentials that may be used to provide a wide variety of functionality. For example, the secure element 112 may maintain functionality to act as part of a multi-tiered authentication system. For instance, the secure element 112 may be configured to answer a challenge. This answer may then be provided as part of an authentication process with a user name and password, a personal identification number (PIN), and so on such that the user may be authenticated with increased trustworthiness. Further discussion of the leveraging of techniques to answer a challenge by the secure element 112 may be found in relation to FIGS. 8 and 9.

In another example, the secure element 112 may be leveraged for remote identification. The mobile communication device 104, for instance, may be used to store an "identity" of a user of the device. This identity may then be provided to other parties to verify that the user "is who they say they are." In one such implementation, the mobile communication device 104 may be "tapped" against a reader at a physical location of an entity that desires to verify the identity of a user of the mobile communication device 104. Additionally, this identity may be used to sign documents using the mobile communication device 104. Further, the mobile communication device 104 may be configured to maintain a plurality of such identities for verification by a plurality of different entities, further discussion of which may be found in relation to FIGS. 6 and 7.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the provisioning techniques described below are platform-independent, meaning that the techniques may be implemented on a variety of commercial computing platforms having a variety of processors.

Example Procedures

The following discussion describes techniques that may be implemented utilizing the previously described systems and devices. Aspects of each of the procedures may be implemented in hardware, firmware, software, or a combination thereof. The procedures are shown as a set of blocks and/or arrows that specify operations performed by one or more devices and/or data communicated between the devices and are not necessarily limited to the orders shown for performing the operations by the respective blocks or arrows. In portions of the following discussion, reference will be made to the environment 100 of FIG. 1.

Figure 2:
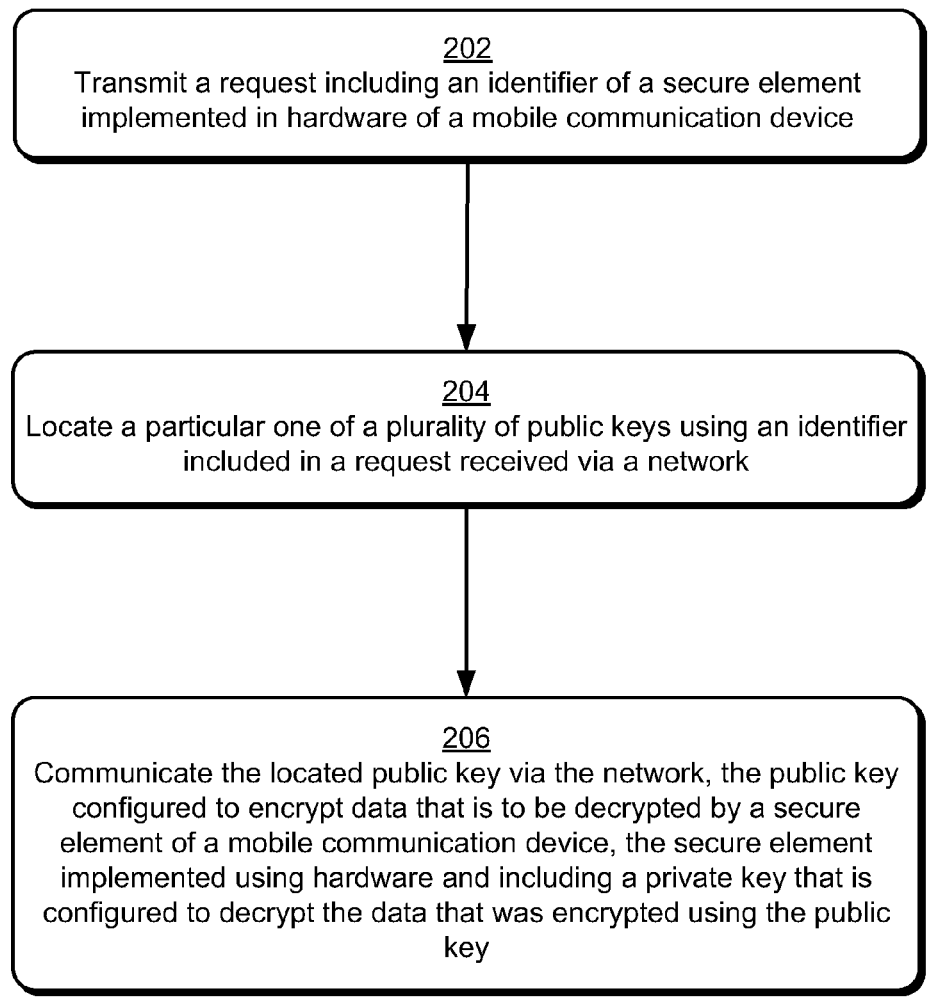
FIG. 2 is a flow diagram depicting a procedure in an example implementation in which a public key is located to communicate with a mobile communication device.

FIG. 2 depicts a procedure 200 in an example implementation in which a public key is located to communicate with a mobile communication device. A request is transmitted that includes an identifier of a secure element implemented in hardware of a mobile communication device (block 202). For example, the identifier may describe a serial number of an integrated circuit that implements the secure element 112 of the mobile communication device 104. The serial number 122, for instance, may be stored during manufacture of the mobile communication device 104 with a corresponding public key 124. As previously noted, the public key 124 may be part of a public/private key pair 124, 114 that uses asymmetric encryption.

The request may be transmitted by a variety of different entities, such as by a service provider 102 in order to communicate with the mobile communication device 104, by the mobile communication device 104, itself, to provision functionality, and other entities. For example, the service provider 102 may obtain the serial number 112 from the mobile communication device 104 and communicate it to the provisioning service 106 to secure communications between the service provider 102 and the mobile communication device 104. In another example, the mobile communication device 104 may receive a request from a user of the device to provision functionality of the mobile communication device 104, such as to enable execution of an application 116 by the device, provide a secure communication channel with another device (e.g., the service provider), and so on. A variety of other examples are also contemplated.

A particular one of a plurality of public keys is located using an identifier included in a request received via a network (block 204). Continuing with the previous example, the identifier (e.g., a serial number or other identifier) may be used by the provisioning service 106 to locate the public key 124. In this way, the provisioning service 106 may locate the public key 124 without engaging in an encryption or decryption operation itself. Further, the provisioning service 106 may be configured to be auditable by other entities to verify that the provisioning service 106 is not able to decrypt data to be sent to the mobile communication device 104 that is encrypted using the public key 124. And thus, the provisioning service 106 may be "trusted" by service provider 102, the mobile communication device 104, and other entities that are to communicate via the service.

The located public key is communicated via the network, the public key configured to encrypt data that is to be decrypted by a secure element of a mobile communication device, the secure element implemented using hardware and including a private key that is configured to decrypt the data that was encrypted using the public key (block 206). The secure element 112, for instance, may receive data encrypted by the public key 124 and decrypt the data using hardware functionality of the secure element 112 itself. In this way, the private key 114 as well as the data are protected from malicious parties. The secure element 112 may then expose the data or keep the data internal, further discussion of which may be found in relation to FIGS. 4 and 5.

Figure 3:
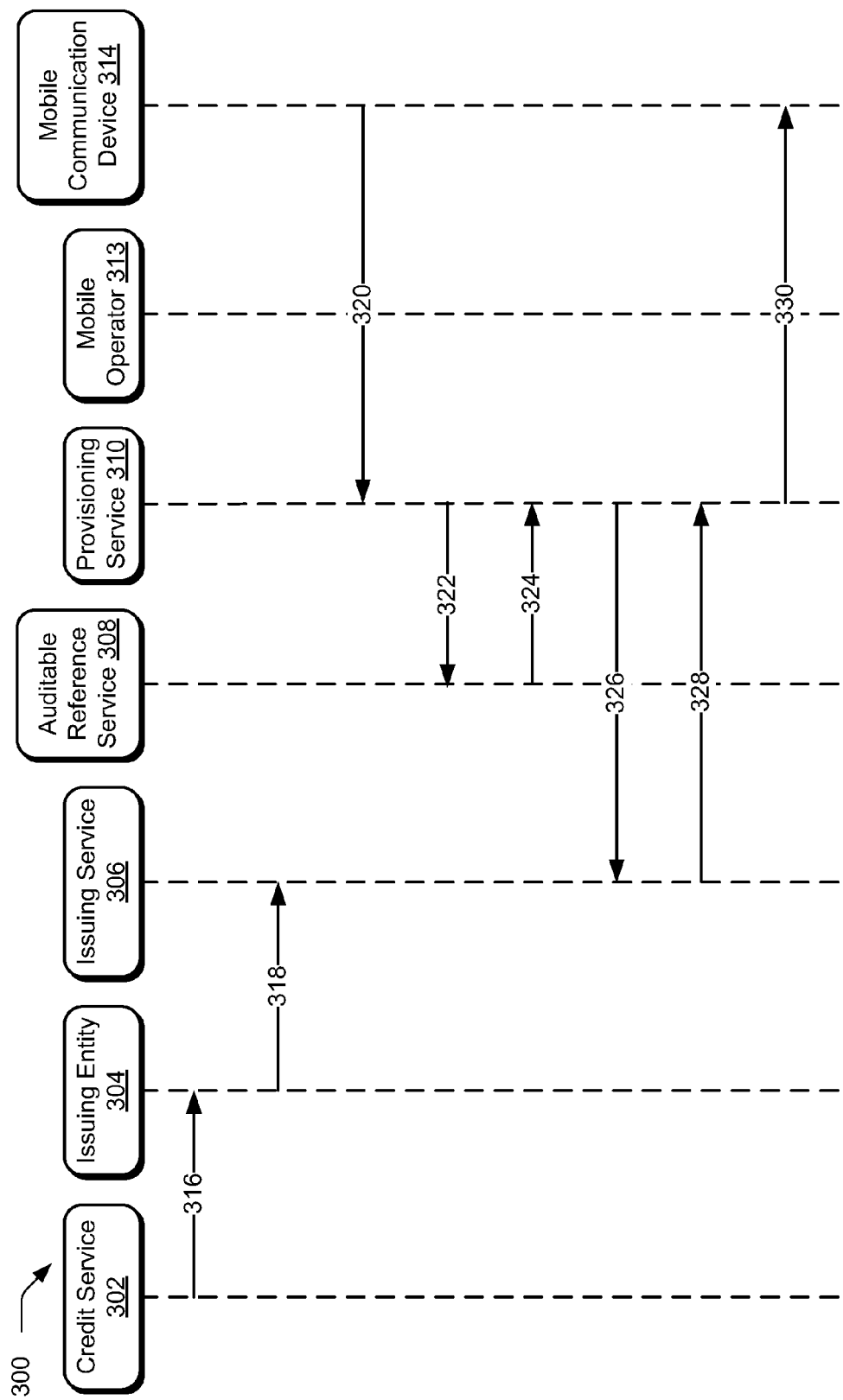
FIG. 3 is a chart depicting a procedure in an example implementation in which a technique to communicate data securely to a mobile communication device is shown

FIG. 3 depicts a procedure 300 in an example implementation in which a technique to communicate data securely to a mobile communication device is shown. The procedure 300 is illustrated as including a credit service 302, an issuing entity 304, (e.g., a bank or other financial institution), an issuing service 306 (e.g., Gemalto), an auditable reference service 308, a provisioning service 310 (which may or may not correspond to the provisioning service 106 of FIG. 1), a mobile operator (e.g., an operator of a wireless network), and a mobile communication device 314, which may or may not correspond to the mobile communication device 104 of FIG. 1. In the following discussion, the arrows will be used in indicate an example flow of data. It should be readily apparent however, that the order and the data referenced therein describe one of a variety of different implementations.

At arrow 316, data is communicated from the credit service 302 (e.g., a credit card service such as Visa) to an issuing entity 304, such as a bank or other financial institution that issues credit cards. At arrow 318, the issuing entity 304 communicates data to an issuing service 306 to issue one or more credit cards, e.g., to permit use of the credit cards for online payments and so on.

At arrow 320, a mobile communication device 314 makes a request to a provisioning service 310 to provision functionality of the mobile communication device 314. A wide variety of functionality may be provisioned, such as to enable execution of an application by the mobile communication device 314, to obtain credentials to access a web service, and so on.

At arrow 322, the provisioning service 310 communicates with an auditable reference service 308 to locate a public key that is associated with the mobile communication device 314. As stated in relation to FIG. 2, for instance, the request may include an identifier (e.g., a serial number) that is usable to locate a public key of mobile communication device 314. Further, the auditable reference service 308 may be configured to permit other entities to "check" the device to ensure that communication performed through the device or other devices are protected from discovery as previously described.

At arrow 324, the provisioning service 310 receives a response to the request of arrow 322 that includes the public key that corresponds to the mobile communication device 314. At arrow 326, the provisioning service 310 then provides this public key to the issuing service 306 along with a request for data (e.g., credentials) to be communicated to the mobile communication device 314. At arrow 328, the provisioning service 310 receives the data encrypted by the public key and at arrow 330 communicates the data to the mobile communication device 314.

Thus, in this example the provisioning service 310 acts as an intermediary to manage provisioning of the mobile communication device. Further, the "trustworthiness" of this function may be verified by outside entities through auditing of the auditable reference service 308. In this way, even if the auditable reference service 308 is compromised by a malicious party the integrity of data on the mobile communicates device 314 is maintained, further discussion of which may be found in relation to the following figures.

Figure 4:
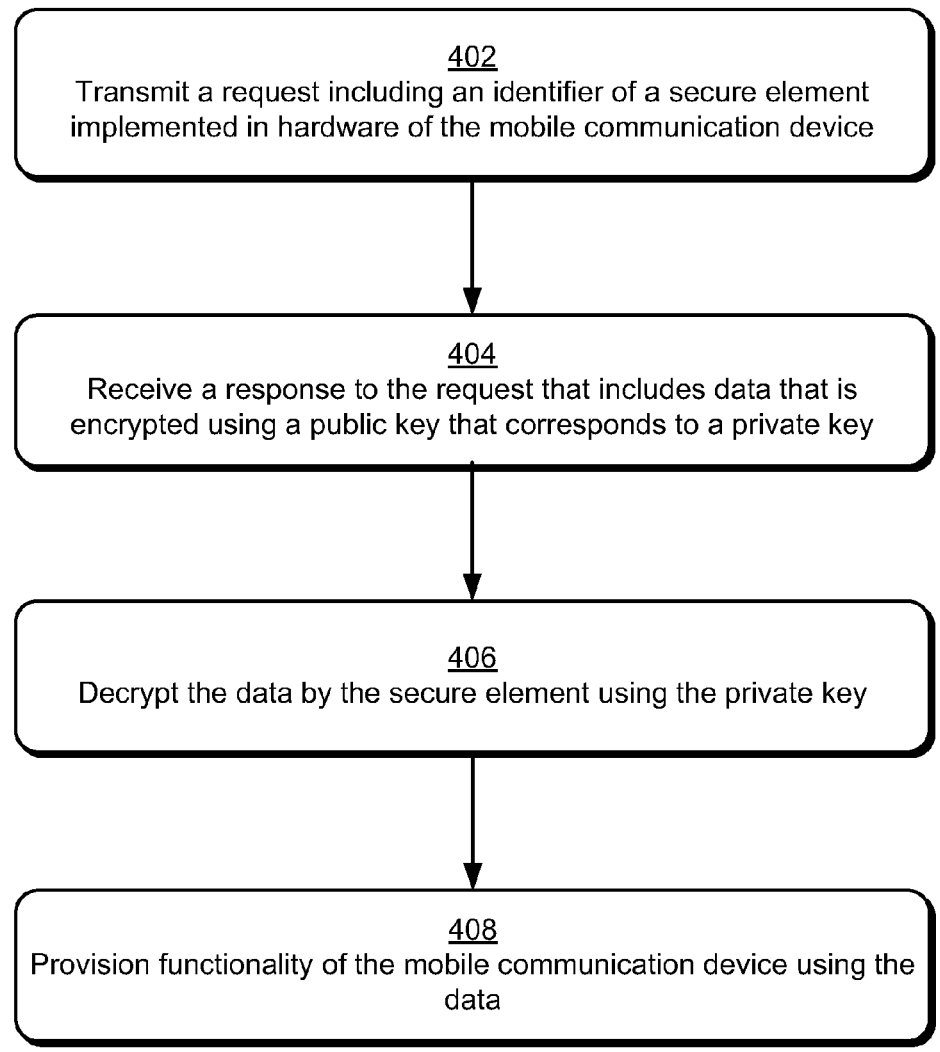
FIG. 4 is a flow diagram depicting a procedure in an example implementation in which a technique to receive and process data received by a mobile communication device from a provisioning service is shown.

FIG. 4 depicts a procedure 400 in an example implementation in which a technique to receive and process data received by a mobile communication device from a provisioning service is shown. A request is transmitted that includes an identifier of a secure element implemented in hardware of the mobile communication device (block 402). As before, the secure element may be identified in a variety of ways, such as through a serial number of an integrated circuit that includes the secure element.

A response is received to the request that includes data that is encrypted using a public key that corresponds to a private key (block 404). The response, for instance, may be obtained directly from a service provider 102 and encrypted using the public key provided by the provisioning service 106. In another instance, the response may be received indirectly via the provisioning service 310 as described in relation to FIG. 3, and so on.

The data is decrypted by the secure element using the private key (block 406). For example, the secure element 112 may be configured using hardware as previously described and include functionality to decrypt the data using the private key 114 without communicating the key "off" an integrated circuit (e.g., computer chip) that implements the element. Functionality of the mobile communication device may then be provisioned using the data (block 408). A variety of different functionality may be provisioned, an example of which is discussed in relation to the following figure.

Figure 5:
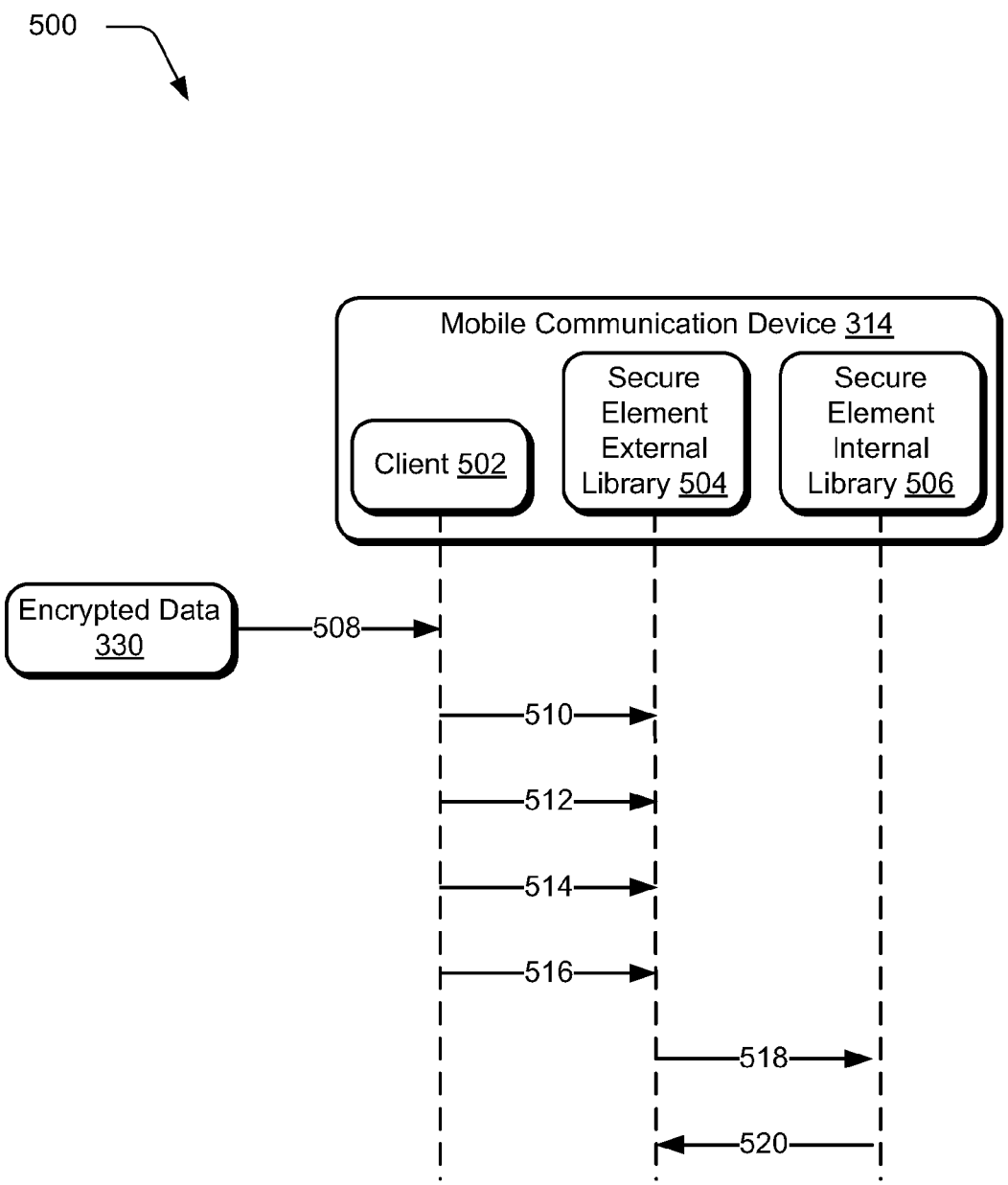
FIG. 5 is a flow diagram depicting a procedure in an example implementation in which example operation of a secure element of FIG. 1 is shown.

FIG. 5 is a flow diagram depicting a procedure in an example implementation in which example operation of a secure element of FIG. 1 is shown. Continuing from FIG. 3, the mobile communication device 314 is illustrated as including a client 502 and a secure element implemented using a secure element external library 504 and a secure element internal library 506.

At arrow 508, the client 502 (e.g., an application) of the mobile communication device 314 is illustrated as receiving the encrypted data 330, e.g., from the provisioning service 310 of FIG. 3. The client 502 may then detect that the data is encrypted and accordingly utilize the secure element to decrypt the data. For example, at arrow 510 the client 502 may initiate the secure element (e.g., an integrated circuit on which the secure element is implemented), initiate an application at arrow 512, perform an authorization handshake at arrow 514, and pass the encrypted data 330 to the secure element external library 504 of the secure element at arrow 516.

The secure element external library 504 may then pass the encrypted data to the secure element internal library 506 at arrow 518, which is then decrypted by the secure element. A result of the decryption is then provided back from the secure element internal library 506 to the secure element external library 504. As previously described, a variety of different examples are also contemplated, such as to keep the data internal to the secure element for subsequent use (e.g., for decryption and/or encryption operations to form a secure channel), expose the data for use by the client 502 (e.g., as credentials for logon, to perform a purchase), and so on. Thus, a variety of different data may be communicated securely to the mobile communication device, such as data to make a purchase using information relating to a credit card, provide an identifier for use as a transit access card, provide an identifier associated with a loyalty card, or provide credentials usable by the mobile communication device to access a premises.

Figure 6:
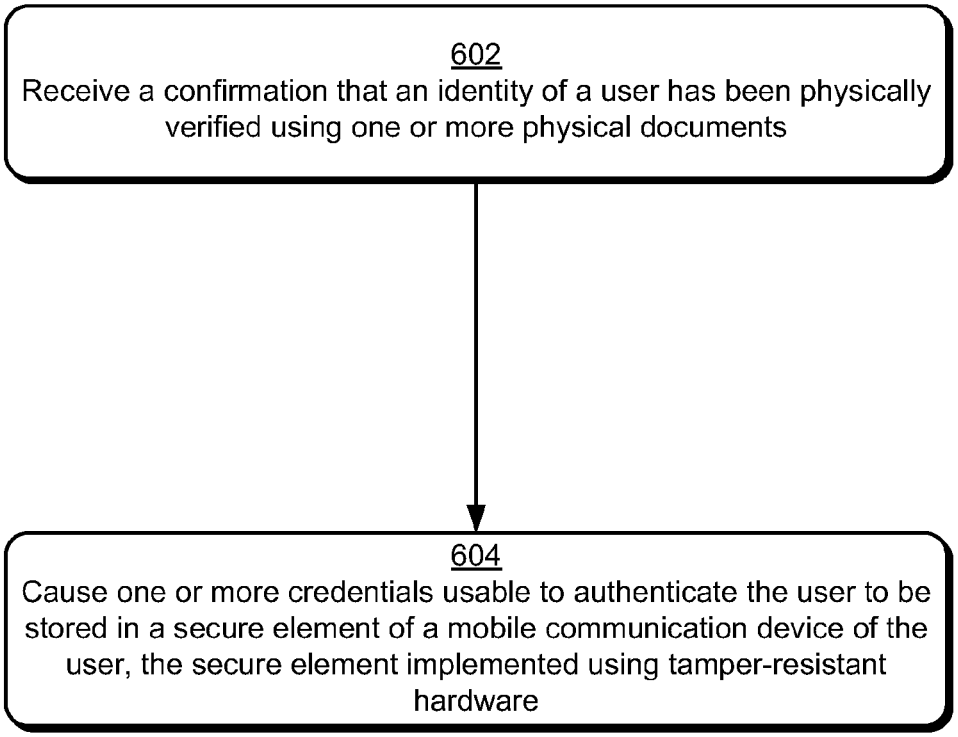
FIG. 6 is a flow diagram depicting a procedure in an example implementation in which credentials are stored in a secure element responsive to a confirmation that an identity of a user has been verified using physical documents.

FIG. 6 depicts a procedure 600 in an example implementation in which credentials are stored in a secure element responsive to a confirmation that an identity of a user has been verified using physical documents. A confirmation is received that an identity of a user has been physically verified using one or more physical documents (block 602). For example, a user may go to a physical location and show documents to a person that may be used to confirm the identity of the user, such as a driver's license, passport, social security card, birth certificate, marriage license, and so on. The person that examines these documents may then interact with a computing device to confirm that the user "is who they say they are" based on the physical documents, such as by interacting with a user interface of the computing device.

One or more credentials that are usable to authenticate the user are caused to be stored in a secure element of a mobile communication device of the user, the secure element implemented using tamper-resistant hardware (block 604). Continuing with the previous example, the confirmation received by the computing device from the person may cause the computing device to initiate one or more techniques to provision credentials on the mobile communication device 102. For instance, techniques may be implemented that involve the provisioning service 106 to communicate the credentials securely "over the cloud" from the search provider 102.

As previously described in relation to FIGS. 2-5, these techniques may include communication of the public key 124 to a service provider 102 which uses the key to encrypt credentials for communication over the network 108 to the mobile communication device 104. The mobile communication device 104 may then provide the encrypted data to the secure element 112, which may use the private key 114 to decrypt the encrypted data that includes the credentials.

The credentials may then be stored within the secure element 112 (e.g., an integrated circuit that implements the secure element 112) without exposing the credentials. Additionally, the secure element 112 may be configured to be tamper resistant to reduce a likelihood of snooping and/or physical removal of the element as previously mentioned in relation to FIG. 1. In this way, the credentials may be stored securely with a reduced likelihood of being compromised by malicious parties. Further, the credentials may be used for a variety of different purposes, one example of which may be found in relation to the following figure.

Figure 7:
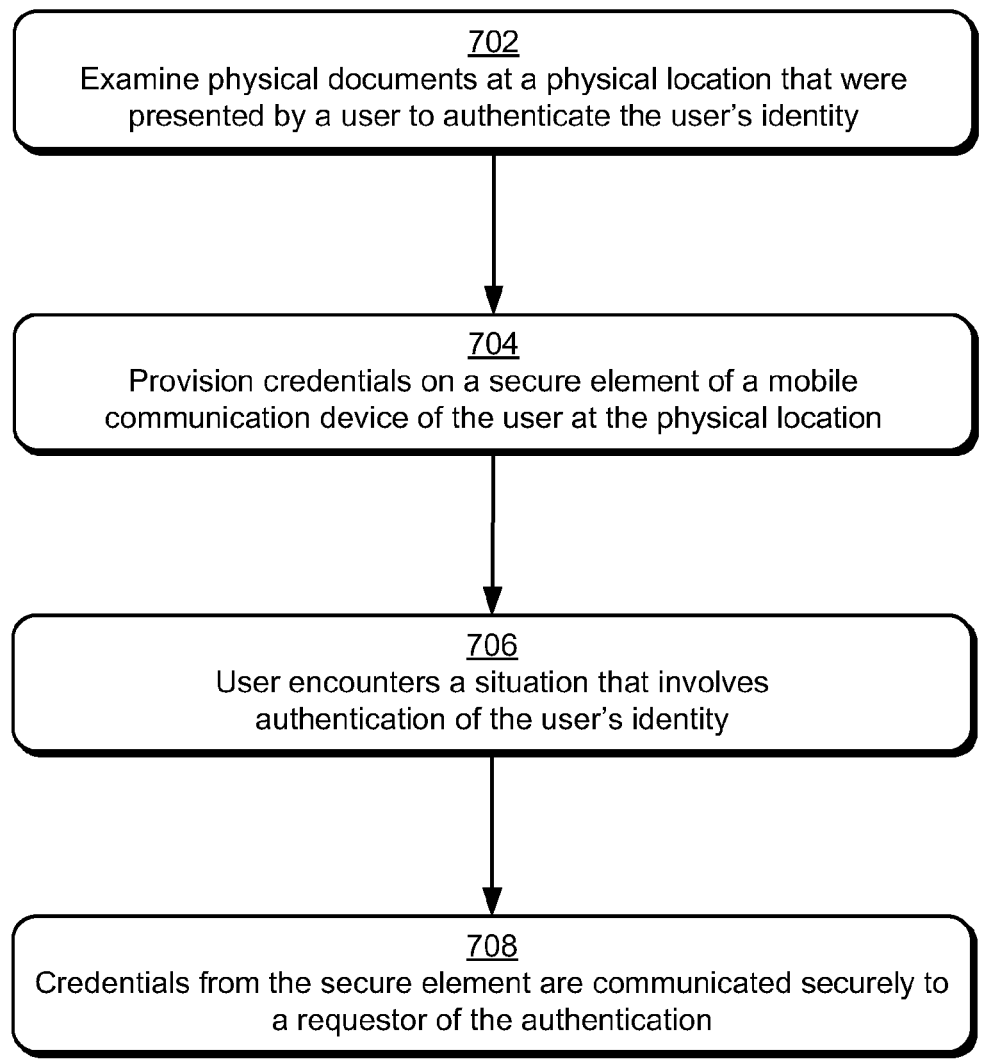
FIG. 7 is a flow diagram depicting a procedure in an example implementation in which credentials are provisioned on a mobile communication device that are usable to authenticate a user's identity.

FIG. 7 depicts a procedure 700 in an example implementation in which credentials are provisioned on a mobile communication device that are usable to authenticate a user's identity. As before, physical documents are examined at a physical location, the documents presented by a user to authenticate the user's identity (block 702). For example, a user may take a mobile communication device to a passport office along with documents that are usable to authenticate the user's identity, such as a driver's license, social security card, and so on. An employee or other person at the passport office may then examine the documents to authenticate that the user "is who they say they are."

The employee may then initiate an operation to provision credentials on a secure element of the mobile communication device of the user at the physical location (block 704). For example, a computing device at the passport office may be used to securely provide credentials to the mobile communication device 104 over a local connection between the computing device and the mobile communication device 104. For instance, the credentials may be communicated responsive to tapping the device on an NFC reader and read using near field technology.

The credentials may be generated locally by the computing device, obtained remotely over the network 108, and so on. Further, other provisioning techniques are also contemplated such as those previously described in relation to FIGS. 2-5. Thus, the credentials may be securely maintained by a mobile communication device 104 of the user, which may support a variety of different functionality.

A user may encounter a situation that involves authentication of the user's identity (block 706), such as travel to a foreign country following the previous passport example. Upon entering immigration, the foreign country may demand a passport.

In response, credentials from the secure element are communicated securely to a requestor of the authentication (block 708). The user, for instance, may "tap" the mobile communication device 102 against a reader. Credentials from the secure element 112 may then be used to authenticate the user, such as to obtain an electronic copy of the user's passport from a service over the network 108. Further, the mobile communication device 104 may be used also to sign paperwork using credentials stored in the secure element, such as to sign a declaration form. Thus, the mobile communication device 104 may serve as a ready source to authenticate an identity of the user. Although these examples describe communicating credentials that are stored in the secure element, the credentials may also be used to answer challenges to authenticate a user's identity, further discussion of which may be found in relation to the following figure.

Figure 8:
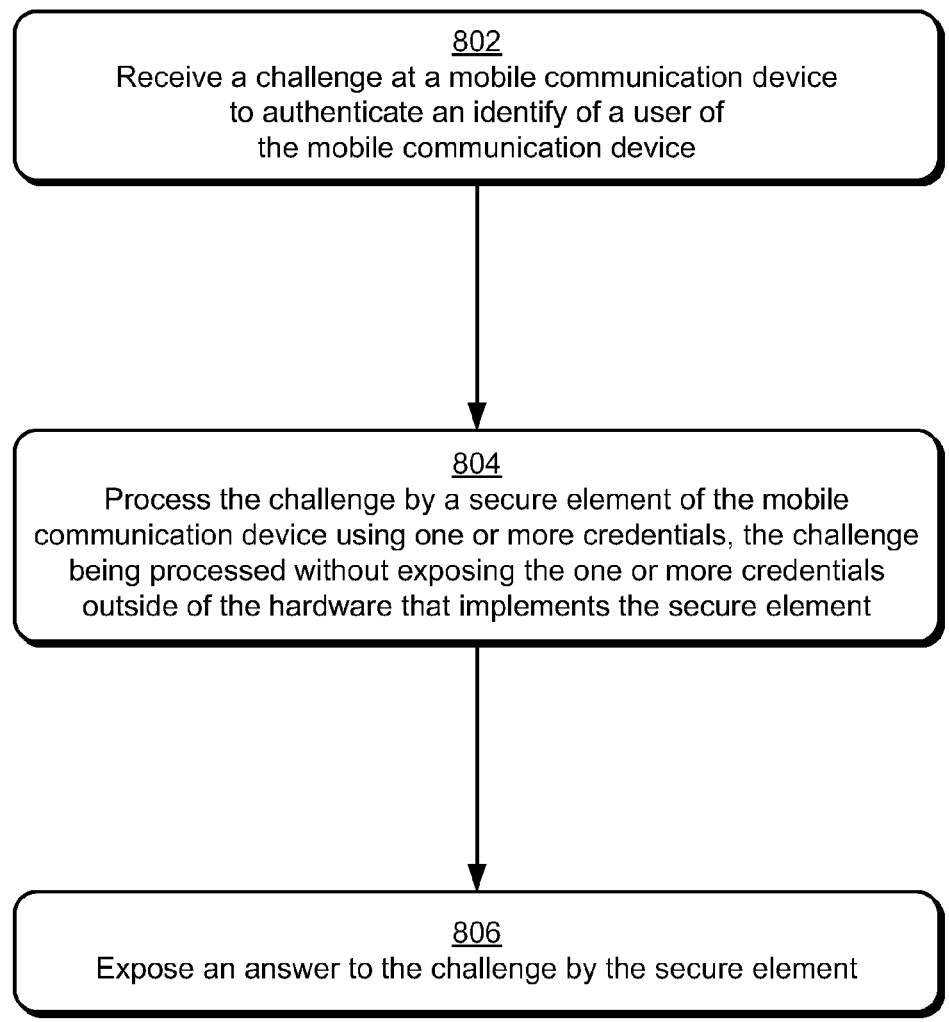
FIG. 8 is a flow diagram depicting a procedure in an example implementation in which a secure element of a mobile communication device is configured to answer a challenge that is usable to authenticate an identity of a user.

FIG. 8 depicts a procedure 800 in an example implementation in which a secure element of a mobile communication device is configured to answer a challenge that is usable to authenticate an identity of a user. A challenge is received at a mobile communication device to authenticate an identity of a user of the mobile communication device (block 802). The challenge, for instance, may be include a collection of letters that are entered by a user of the mobile communication 104, received via an application that is executed on a processor of the mobile communication device 104 that is separate from the secure element 112, and so on.

The challenge is processed by a secure element of the mobile communication device using one or more credentials, the challenge being processed without exposing the one or more credentials outside of hardware that implements the secure element (block 804). As discussed in relation to FIG. 5, the mobile communication device may receive data and perform processing using the data without exposing intermediate results of the processing or data used to perform the processing (e.g., the credentials) outside of the secure element 112. Therefore, the challenge may be processed using credentials that may be kept secret before, during, and after the processing, such as through use of cryptographic techniques and so on.

An answer to the challenge may then be exposed by the secure element (block 806). The answer may be output in a variety of ways. The answer may be for manual entry by a user into a user interface, may be output to an application that is to use to answer as part of a login operation, and so on, further discussion of which may be found in relation to the following figure.

Figure 9:
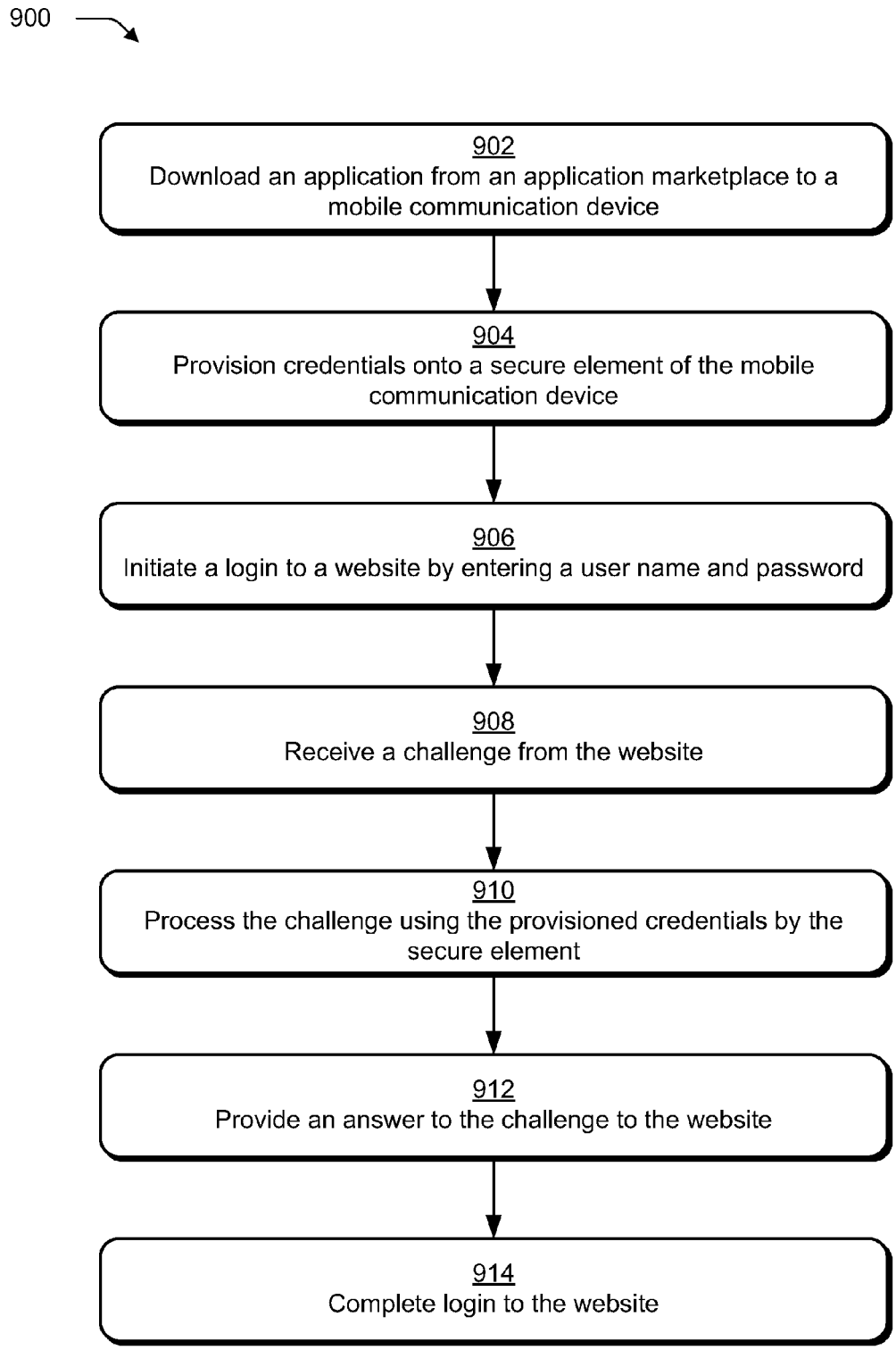
FIG. 9 is a flow diagram depicting a procedure in an example implementation in which an answer to a challenge processed by a secure element of a mobile communication device is used as part of a multi-tier remote authentication technique.

FIG. 9 depicts a procedure 900 in an example implementation in which an answer to a challenge processed by a secure element of a mobile communication device is used as part of a multi-tier remote authentication technique. An application is downloaded from an application marketplace to a mobile communication device (block 902). The mobile communication device 104, for instance, may navigate to a service provider 102 over a network 108 to cause an application 130 to be downloaded to the mobile communication device 104. In this example, the application is provided by a bank to perform online banking and other account management operations.

Credentials are provisioned onto a secure element of the mobile communication device (block 904). A variety of different techniques may be used to provision the credentials. In one example, "in person" techniques are utilizes as previously described in which the user presents physical documents at a physical location (e.g., a branch of the bank) to cause credentials to be stored in the secure element 112. In another example, the provisioning service 106 may be utilized to securely communicate the credentials between the bank and the mobile communication device 104, either directly or indirectly. A variety of other examples are also contemplated.

A login to a website is initiated by entering a user name and password (block 906). The user, for example, may be prompted to enter this information by the banking application. In response, a challenge may be received from the website (block 908), which may be configured as a string of characters, a question, and so on. The challenge is then communicated to the secure element 112, which processes the challenge using the provisioned credentials (block 910). The secure element 112, for instance, may apply one or more cryptographic techniques to the string of letters (e.g., process using a cryptographic key) to produce an answer, find a answer to the quest using the credentials, and so on.

The answer to the challenge is then provided to the website (block 912) which may then be used to complete login to the website. Thus, a multi-tiered approach may be utilized to login to the website that leverages the secure element. Although a web site was described, a variety of different resources are contemplated, such as to access an ATM, data storage, computing device, lock of a physical location, safe, opening a vehicle door, starting a vehicle, and so on. Thus, the credentials stored in the secure element 112 may be used for a variety of purposes, such as to authenticate the user to make a purchase using information relating to a credit card, provide an identifier for use as a transit access card, provide an identifier associated with a loyalty card, or provide credentials usable by the mobile communication device to access a premises.

Example Device

Figure 10:
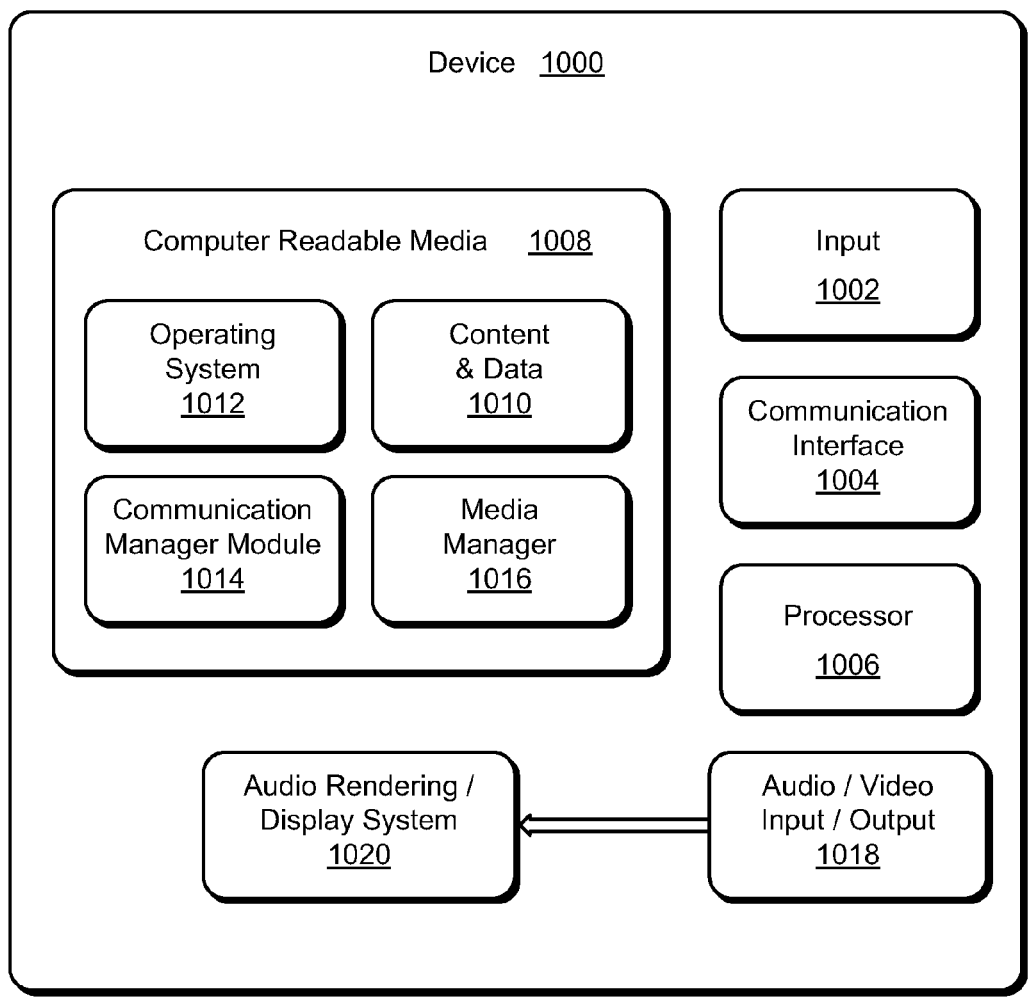
FIG. 10 illustrates various components of an example device that can be implemented in various embodiments as any type of a mobile device to implement embodiments of devices, features, and systems for mobile communications.

FIG. 10 illustrates various components of an example device 1000 that can be implemented in various embodiments as any type of a mobile device to implement embodiments of devices, features, and systems for mobile communications. For example, device 1000 can be implemented as any of the mobile communication devices 104 described with reference to respective FIG. 1. Device 1000 can also be implemented to access a network-based service, such as a social network service as previously described.

Device 1000 includes input 1002 that may include Internet Protocol (IP) inputs as well as other input devices. Device 1000 further includes communication interface 1004 that can be implemented as any one or more of a wireless interface, any type of network interface, and as any other type of communication interface. A network interface provides a connection between device 1000 and a communication network by which other electronic and computing devices can communicate data with device 1000. A wireless interface enables device 1000 to operate as a mobile device for wireless communications.

Device 1000 also includes one or more processors 1006 (e.g., any of microprocessors, controllers, and the like) which process various computer-executable instructions to control the operation of device 1000 and to communicate with other electronic devices. Device 1000 can be implemented with computer-readable media 1008, such as one or more memory components, examples of which include random access memory (RAM) and non-volatile memory (e.g., any one or more of a read-only memory (ROM), flash memory, EPROM, EEPROM, etc.).

Computer-readable media 1008 provides data storage to store content and data 1010, as well as device applications and any other types of information and/or data related to operational aspects of device 1000. For example, an operating system 1012 can be maintained as a computer application with the computer-readable media 1008 and executed on processor 1006. Device applications can also include a communication manager module 1014 (which may be used to provide telephonic functionality) and a media manager 1016.

Device 1000 also includes an audio and/or video output 1018 that provides audio and/or video data to an audio rendering and/or display system 1020. The audio rendering and/or display system 1020 can be implemented as integrated component(s) of the example device 1000, and can include any components that process, display, and/or otherwise render audio, video, and image data. Device 1000 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving at a mobile communication device of a user, from a third party computing device, a confirmation that an identity of the user has been verified; and
   causing one or more credentials usable to authenticate the identity of the user to be stored in a secure element of the mobile communication device of the user, the secure element implemented using tamper-resistant hardware, and the one or more credentials kept from being exposed outside the secure element,
   wherein the one or more credentials are encrypted using a public key by an entity that obtains the public key responsive to provision of an identifier of a serial number of an integrated circuit that forms the hardware secure element of the mobile communication device, wherein the public key is one of a plurality of public keys which are located on one or more devices of a provisioning service that are auditable by an outside party to determine that information stored by the one or more devices is not configured to decrypt data encrypted by one or more of the plurality of public keys.

2. A method as described in claim 1, wherein in the secure element includes a private key configured to decrypt data that includes the one or more credentials that was encrypted using a corresponding public key, the secure element configured to perform the decryption without exposing the private key and the one or more credentials outside of the hardware of the secure element.

3. A method as described in claim 1, wherein the hardware is tamper resistant such that the credentials, after storage, are not exposed outside of the secure element by the mobile communication device.

4. A method as described in claim 1, wherein the hardware is tamper resistant such that an integrated circuit that is used to implement the secure element is resistant to removal from a circuit board of the mobile communication device.

5. A method as described in claim 1, wherein the hardware is tamper resistant such that an integrated circuit that is used to implement the secure element is resistant to snooping.

6. A method as described in claim 1, wherein the one or more credentials are usable to authenticate the user without manual entry of information by the user.

7. A method as described in claim 1, wherein the mobile communication device is configured to include telephone functionality.

8. A method as described in claim 1, wherein the one or more credentials are configured for use by the mobile communication device to authenticate the user to make a purchase using information relating to a credit card, provide an identifier for use as a transit access card, provide an identifier associated with a loyalty card, or provide credentials usable by the mobile communication device to access a premises.

9. A method comprising:
   receiving a challenge at a mobile communication device to authenticate an identity of a user of the mobile communication device;
   processing the challenge by a secure element of the mobile communication device, the secure element being implemented in tamper-resistant hardware, said processing using one or more credentials stored by the secure element, the challenge being processed without exposing the one or more credentials outside of hardware that implements the secure element and without requiring further input from the user, wherein the one or more credentials are encrypted using a public key by an entity that obtains the public key responsive to provision of an identifier of a serial number of an integrated circuit that forms the hardware that implements the secure element of the mobile communication device, wherein the public key is one of a plurality of public keys which are located on one or more devices of a provisioning service that are auditable by an outside party to determine that information stored by the one or more devices is not configured to decrypt data encrypted by one or more of the plurality of public keys; and
   exposing an answer to the challenge by the secure element.

10. A method as described in claim 9, wherein the receiving is performed by an application that executes on a processor of the mobile communication device that is not part of the secure element and the exposing of the answer by the secure element exposes the answer to the application.

11. A method as described in claim 9, wherein the secure element includes a private key configured to decrypt data that includes the challenge that was encrypted using a corresponding public key, the secure element configured to perform the decryption without exposing the private key outside of the secure element.

12. A method as described in claim 9, wherein the processing involves an encryption or decryption operation using one or more encryption keys stored in the secure element.

13. A method as described in claim 9, wherein the answer is configured to be provided along with a user name and password to gain access to a resource.

14. A method as described in claim 9, wherein the answer is configured to be provided along with personal identification number (PIN) to gain access to a resource.

15. A method as described in claim 9, wherein successive said processing used to authenticate the user involves different challenges, respectively.

16. A mobile communication device comprising a secure element implemented in tamper-resistant hardware that is configured to decrypt credentials received from a third party computing device using a private key included in the secure element configured during manufacture to include the private key and store the credentials once decrypted in the secure element without exposing said credentials outside of the secure element, the credentials configured to authenticate the identity of a user of the mobile communication device for access to a resource without further input from the user, wherein the credentials are encrypted using a public key by an entity that obtains the public key responsive to provision of an identifier of a serial number of an integrated circuit that forms the hardware secure element of the mobile communication device, wherein the public key is one of a plurality of public keys which are located on one or more devices of a provisioning service that are auditable by an outside party to determine that information stored by the one or more devices is not configured to decrypt data encrypted by one or more of the plurality of public keys.

17. A mobile communication device as described in claim 16, wherein the credentials are configured for use by the mobile communication device to make a purchase using information relating to a credit card, provide an identifier for use as a transit access card, provide an identifier associated with a loyalty card, provide credentials usable by the mobile communication device to access a premises, open a vehicle, or start a vehicle.

18. A mobile communication device as described in claim 16, wherein the credentials are usable by the secure element to generate a signature to sign a document.

19. A method comprising:
receiving a confirmation that an identity of a user has been verified; and
causing one or more credentials usable to authenticate the identity of the user to be stored in a secure element of a mobile communication device of the user, the secure element implemented using tamper-resistant hardware, and the one or more credentials kept from being exposed outside the secure element wherein:
the one or more credentials are encrypted using a public key by an entity that obtains the public key responsive to provision of an identifier of a serial number of an integrated circuit that forms the hardware secure element of the mobile communication device; and
the public key is one of a plurality of public keys which are located on one or more devices of a provisioning service that are auditable by an outside party to determine that information stored by the one or more devices is not configured to decrypt data encrypted by one or more of the plurality of public keys.

20. A mobile communication device comprising a secure element implemented in tamper-resistant hardware that is configured to:
receive, from an application executing on the mobile communication device, a request to provision application credentials to the secure element;
in response to the provisioning request by the application, store the application credentials in the secure element;
receive a request by the application for a signature of data using the credentials; and
in response to the request, returning the signature using the data and the credentials stored in the secure element without exposing the credentials outside of the secure element, wherein the credentials are encrypted using a public key by an entity that obtains the public key responsive to provision of an identifier of a serial number of an integrated circuit that forms the hardware secure element of the mobile communication device, wherein the public key is one of a plurality of public keys which are located on one or more devices of a provisioning service that are auditable by an outside party to determine that information stored by the one or more devices is not configured to decrypt data encrypted by one or more of the plurality of public keys.

21. A mobile communication device as described in claim 20, the mobile communication device further configured to use the signature to sign a document.

22. A mobile communication device as described in claim 20, wherein the credentials are usable to authenticate a user's identity.

23. A mobile communication device as described in claim 20, wherein the secure element is configured to break upon tampering.

24. A mobile communication device as described in claim 20, wherein the secure element includes a private key.

25. A mobile communication device as described in claim 24, wherein the private key is configured during manufacture.

26. A mobile communication device as described in claim 20, wherein the secure element includes the public key.

27. A mobile communication device as described in claim 26, wherein the public key is associated with the serial number of the secure element.

28. A mobile communication device as described in claim 20, wherein the secure element acts as part of a multi-tiered authentication system.

29. A mobile communication device as described in claim 20, wherein the mobile communication device is a phone.

* * * * *